(12) United States Patent
Ohya et al.

(10) Patent No.: US 12,219,272 B2
(45) Date of Patent: Feb. 4, 2025

(54) PHOTOELECTRIC CONVERSION ELEMENT AND PHOTOELECTRIC CONVERSION DEVICE

(71) Applicant: CANON KABUSHIKI KAISHA, Tokyo (JP)

(72) Inventors: Takeru Ohya, Tokyo (JP); Kenji Michimata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 17/989,811

(22) Filed: Nov. 18, 2022

(65) Prior Publication Data

US 2023/0164452 A1 May 25, 2023

(30) Foreign Application Priority Data

Nov. 19, 2021 (JP) .................................. 2021-188610

(51) Int. Cl.
*H04N 25/131* (2023.01)
*H04N 23/11* (2023.01)

(52) U.S. Cl.
CPC ........... *H04N 25/131* (2023.01); *H04N 23/11* (2023.01)

(58) Field of Classification Search
CPC ...... H04N 25/131; H04N 23/11; H04N 23/12; H04N 25/133
See application file for complete search history.

(56) References Cited

U.S. PATENT DOCUMENTS

2021/0118928 A1* 4/2021 Sayama ............ H01L 27/14621
2022/0124291 A1 4/2022 Michimata

FOREIGN PATENT DOCUMENTS

JP 2008-289000 A 11/2008

* cited by examiner

*Primary Examiner* — Yogesh K Aggarwal
(74) *Attorney, Agent, or Firm* — Venable LLP

(57) ABSTRACT

A photoelectric conversion element includes a pixel area which includes a plurality of rows and a plurality of columns, a first filter which is provided in a first pixel constituting the pixel area and allows passage of visible light in a first wavelength band and infrared light in a second wavelength band, a second filter which is provided in a second pixel constituting the pixel area and allows the passage of the visible light band and the infrared light, and a first light reduction unit which reduces the infrared light having passed through the second filter. The third filter which allows the passage of the visible light and the infrared light is provided in, among pixels constituting the pixel area, each pixel other than the first pixel and the second pixel.

18 Claims, 26 Drawing Sheets

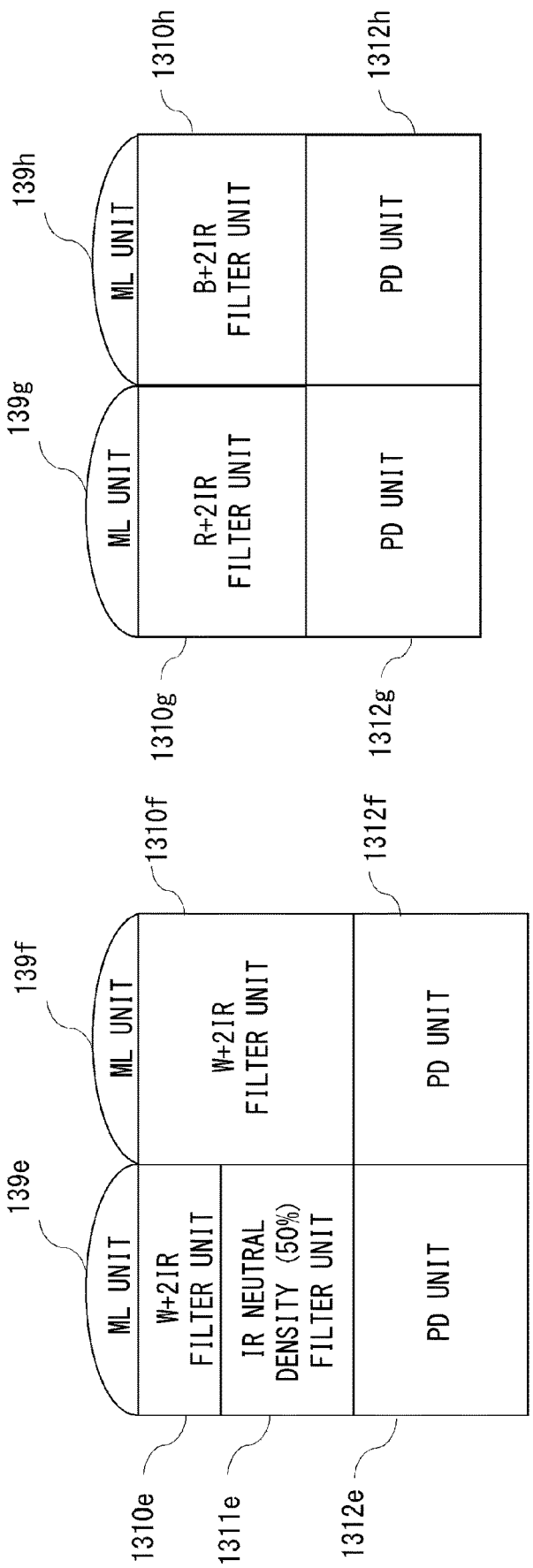
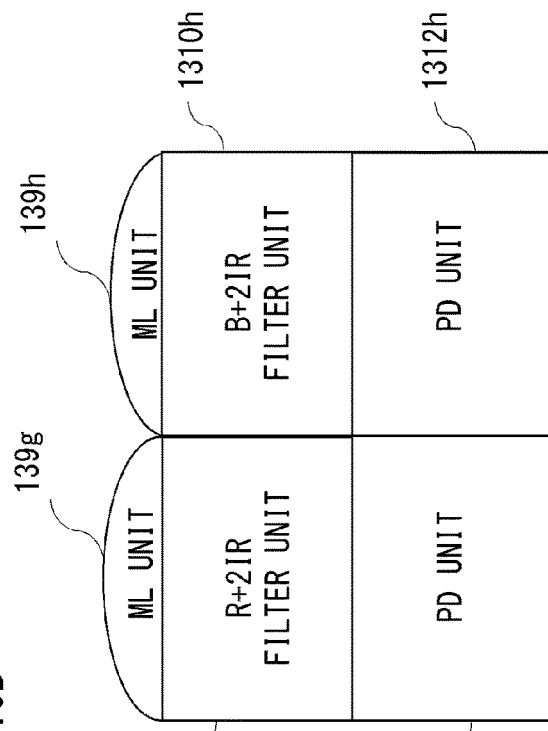
FIG. 10A
FIG. 10B

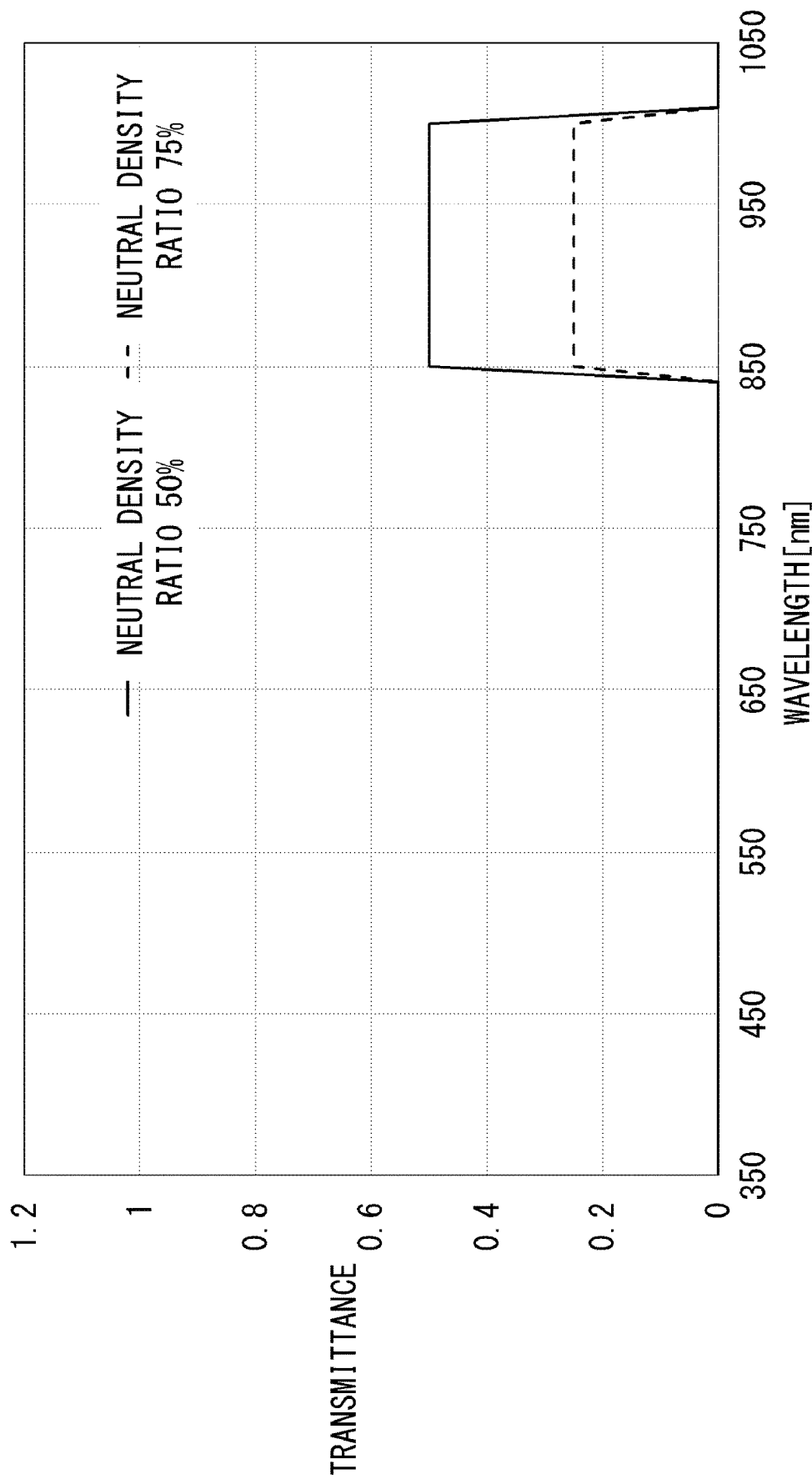

PHOTOELECTRIC CONVERSION ELEMENT AND PHOTOELECTRIC CONVERSION DEVICE

BACKGROUND OF THE INVENTION

Field of the Invention

The present invention relates to a photoelectric conversion element and a photoelectric conversion device capable of acquiring a visible light image and an infrared light image concurrently.

Description of the Related Art

In general, in the field of monitoring or inspection, a camera capable of photographing visible light and infrared light concurrently is in demand. To cope with this, there is proposed a photoelectric conversion element having a pixel array of red (R), green (G), blue (B), and infrared (IR). In this photoelectric conversion element, in addition to color filters of R, G, and B each having sensitivity in a wavelength band of visible light, a color filter of IR having sensitivity to infrared light is stacked on a photodiode (PD).

In addition, in the pixel array of R, G, B, and IR, a G pixel is replaced with an IR pixel, and hence information on visible light is lost. To cope with this, Japanese Patent Application Publication No. 2008-289000 proposes a configuration in which color filters of R+IR, G+IR, B+IR, and white (W)+IR each having sensitivity in wavelength bands of visible light and infrared light are provided on PDs. In the technique in Japanese Patent Application Publication No. 2008-289000, information on IR is extracted on the assumption that the sum of sensitivities of R, G, and B corresponds to the sensitivity of W.

In the technique in Japanese Patent Application Publication No. 2008-289000, that the sum of the sensitivities of R, G, and B corresponds to the sensitivity of W is the assumption of IR component extraction.

However, both ends of a transmittance characteristic of each wavelength of G overlap with a transmittance characteristic of each of R and B, and hence it becomes difficult to satisfy the above assumption. As a result, accuracy of the extraction of the IR component deteriorates, and color reproducibility of a visible light image may deteriorate.

SUMMARY OF THE INVENTION

In view of the foregoing, the technique of the present disclosure provides a photoelectric conversion element and a photoelectric conversion device capable of photographing high-sensitivity and high-resolution visible light and infrared light concurrently.

According to an aspect of the present disclosure, it is provided a photoelectric conversion element including a pixel area which includes a plurality of rows and a plurality of columns, a first filter which is provided in a first pixel constituting the pixel area and allows passage of visible light in a first wavelength band and infrared light in a second wavelength band, a second filter which is provided in a second pixel constituting the pixel area and allows the passage of the visible light in the first wavelength band and the infrared light in the second wavelength band, and a first light reduction unit which reduces the infrared light having passed through the second filter, wherein a third filter which allows the passage of the visible light in the first wavelength band and the infrared light in the second wavelength band is provided in, among pixels constituting the pixel area, each pixel other than the first pixel and the second pixel.

Further features of the present invention will become apparent from the following description of exemplary embodiments with reference to the attached drawings.

BRIEF DESCRIPTION OF THE DRAWINGS

FIGS. 10A and 10B are views showing the cross sections of the pixels of the image sensor unit according to the embodiment;

FIG. 15 is a view showing the transmittance characteristic of each wavelength of the infrared neutral density filter according to the embodiment;

DESCRIPTION OF THE EMBODIMENTS

Figure 1:
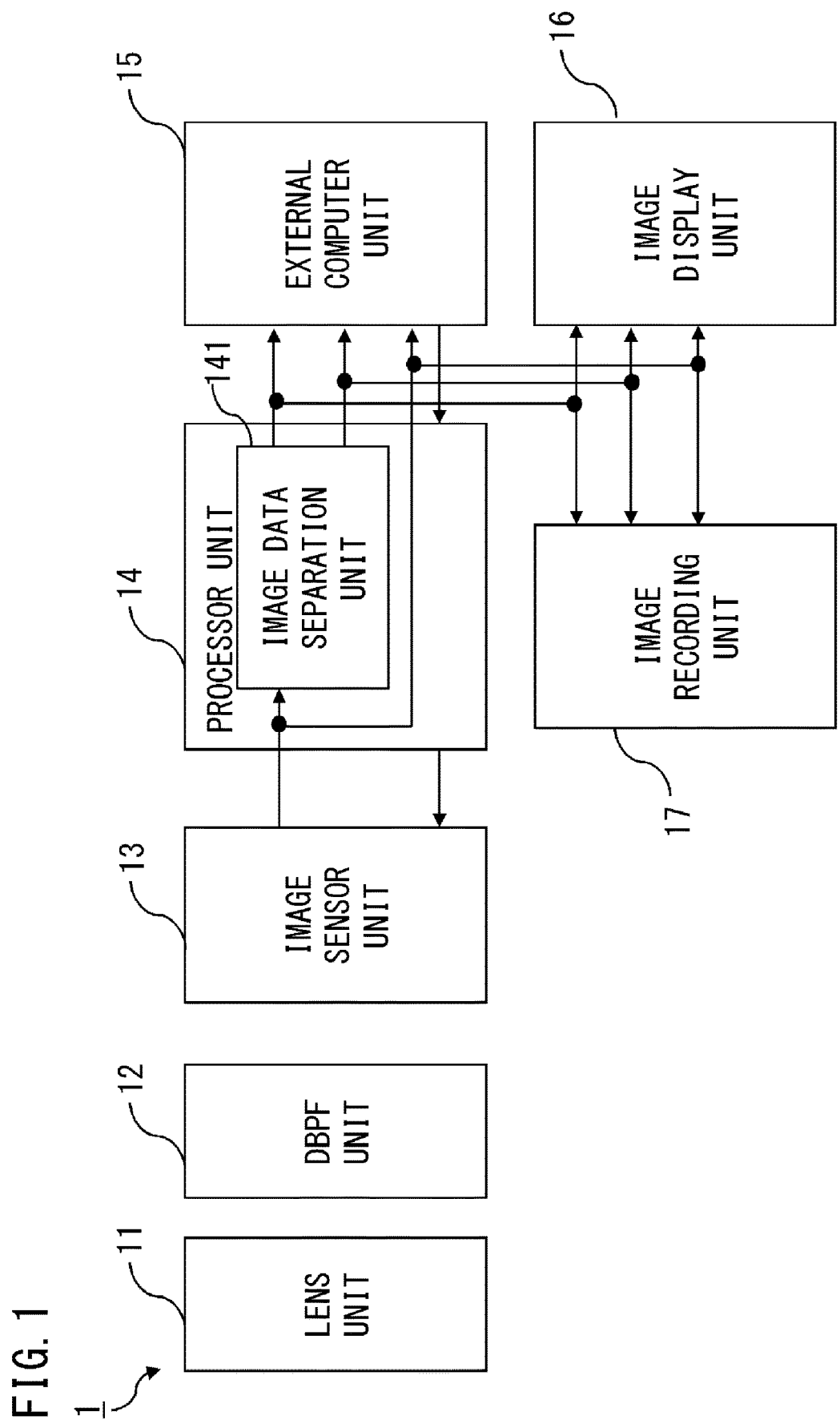
FIG. 1 is a block diagram showing an example of the configuration of a photoelectric conversion device according to an embodiment.

Hereinbelow, preferred embodiments of the technique of the present disclosure will be described with reference to the drawings. Note that the individual drawings are merely drawn for the purpose of explaining structures and configurations, and the dimensions of individual members shown in the drawings do not necessarily reflect actual dimensions. In addition, in the individual drawings, the same reference numerals denote the same members or components and, hereinbelow, the description of duplicate contents will be omitted.

First Embodiment (Configuration) A photoelectric conversion device 1 of a first embodiment will be described with reference to FIGS. 1 to 8. FIG. 1 is a block diagram showing an example of the configuration of the photoelectric conversion device 1. The photoelectric conversion device 1 includes a lens unit 11, a dual band pass filter (DBPF) unit 12, an image sensor unit 13, a processor unit 14, an external computer unit 15, an image display unit 16, and an image recording unit 17.

Figure 2:
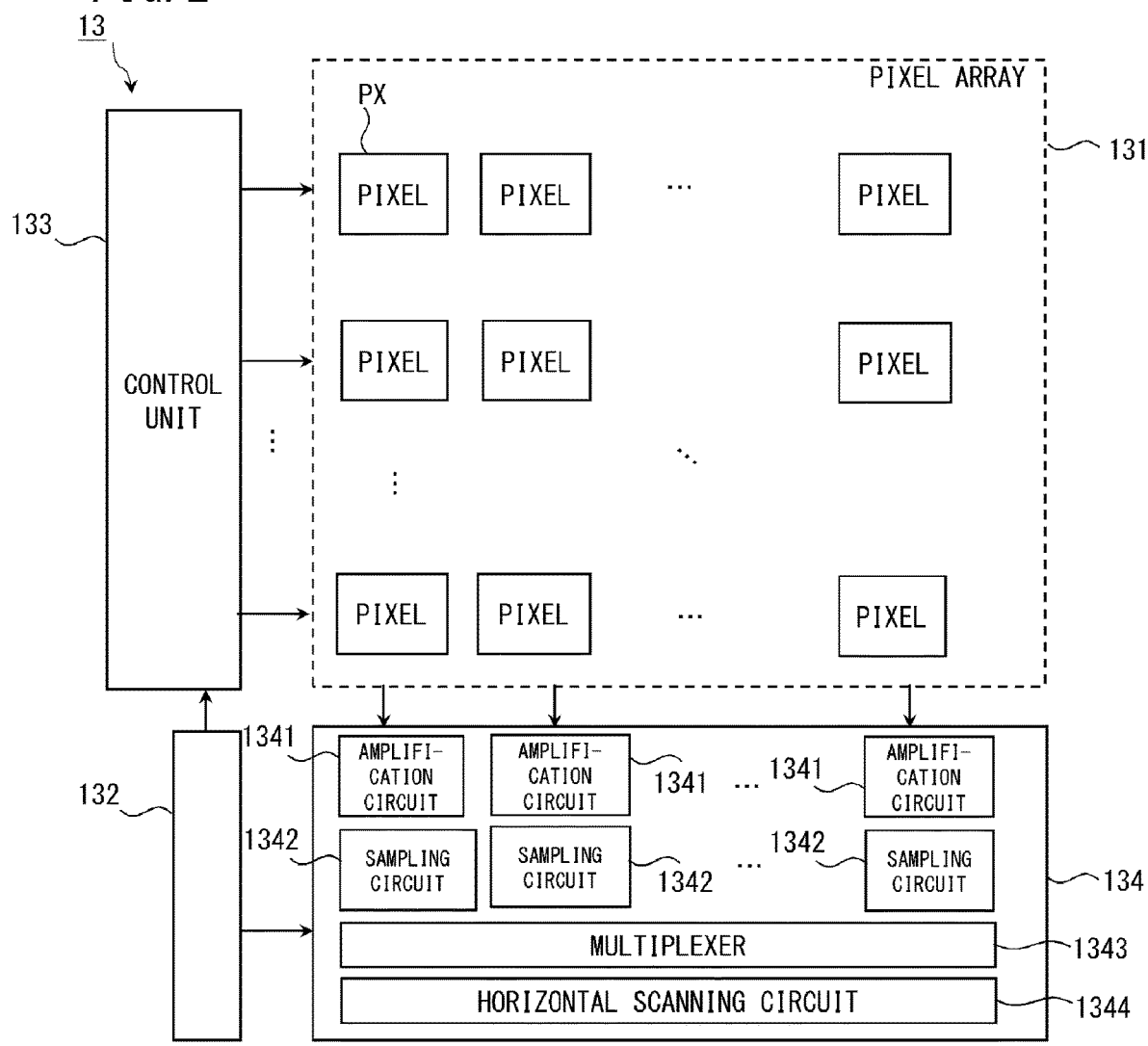
FIG. 2 is a circuit diagram showing an example of the configuration of an image sensor unit according to the embodiment.

The lens unit 11 has a transmittance which allows the passage of light from a wavelength band of visible light to a wavelength band of infrared light. Note that the lens unit 11 is preferably subjected to chromatic aberration correction in ranges of the wavelength bands of the passage. The DBPF unit 12 is an optical filter which allows the passage of light in part of the wavelength band of visible light and light in part of the wavelength band of infrared light. Though described later, the DBPF unit 12 blocks light in a wavelength band positioned between visible light and near-infrared light in order to separate light having passed through the lens unit 11 into a visible light component and an IR component with high accuracy. With this, the DBPF unit 12 separates light having passed through the lens unit 11 into visible light and infrared light, and causes the visible light and the infrared light to be incident on a pixel area of the image sensor unit 13. As shown in FIG. 2, the image sensor unit 13, which serves as a photoelectric conversion element, has a pixel array 131 and a controller 132. The processor unit 14 can communicate with the controller 132, and controls the pixel array 131 with the controller 132 and acquires image data of a subject (not shown). The processor unit 14, which serves as an image generation unit, generates a visible light image and an infrared light image by using a signal output from the photoelectric conversion element. The detail of processing executed by the processor unit 14 will be described later.

The processor unit 14 processes the image data of the subject acquired from the image sensor unit 13, and transmits the processed image data to each of the external computer unit 15, the image display unit 16, and the image recording unit 17. In addition, the processor unit 14 has an image data separation unit 141 which separates the image data of the subject into a visible light image and an infrared light image. The detail of processing executed by the processor unit 14 will be described later. The processor unit 14 may be, e.g., an integrated circuit or a device capable of programming individual functions (e.g., a programmable logic device (PLD) such as a field programmable gate array (FPGA)). Alternatively, the processor unit 14 may also be an arithmetic unit such as a micro processing unit (MPU) or a digital signal processor (DSP) for implementing the individual functions. Alternatively, the processor unit 14 may be a dedicated integrated circuit (an application specific integrated circuit (ASIC) or the like). Alternatively, the processor unit 14 may include a CPU and a memory, and the individual functions may be implemented on software. That is, the functions of the processor unit 14 are implemented by hardware and/or software.

The external computer unit 15 can communicate with the processor unit 14 and the image recording unit 17, and acquires the image data of the subject or the image data which is separated into the visible light image and the infrared light image of the subject and performs image processing. The image display unit 16 can communicate with the processor unit 14 and the external computer unit 15, and displays RAW data of the image data of the subject, the image data which is separated into the visible light image and the infrared light image of the subject, and image data after adjustment in which the image quality of each image data mentioned above is adjusted. The image recording unit 17 records the image data received from the processor unit 14 or the external computer unit 15.

Figure 4:
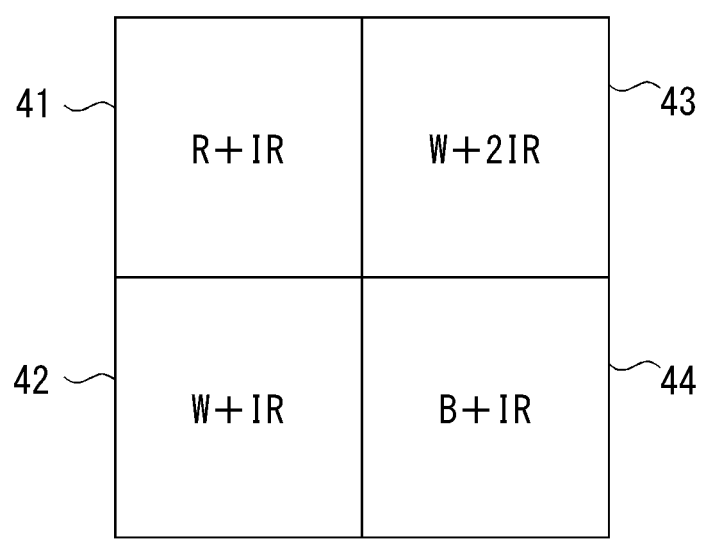
FIG. 4 is a view showing a color filter array of the image sensor unit according to the embodiment.

FIG. 2 shows an example of the configuration of the image sensor unit 13 in the first embodiment. The image sensor unit 13 has a control unit 133 and a signal reading unit 134 in addition to the pixel array 131 and the controller 132. The pixel array 131 includes a plurality of pixels PX arranged in a matrix (so as to form a pixel area including a plurality of rows and a plurality of columns). In the present embodiment, a color filter array shown as an example in FIG. 4 is provided on the pixels PX. In the present embodiment, the control unit 133 is a vertical scanning circuit constituted by a decoder and a shift register, and drives the plurality of pixels PX for each row. The signal reading unit 134 includes a signal amplification circuit 1341 and a sampling circuit 1342 disposed in each column, a multiplexer 1343, and a horizontal scanning circuit 1344 constituted by a decoder and a shift register.

With this configuration, the signal reading unit 134 performs signal reading for each column from the plurality of pixels PX driven by the control unit 133. In sampling by the sampling circuit 1382, correlated double sampling (CDS) processing is used. The controller 132 includes a timing generator, and performs synchronization control of the pixels PX, the control unit 133, and the signal reading unit 134.

Figure 3:
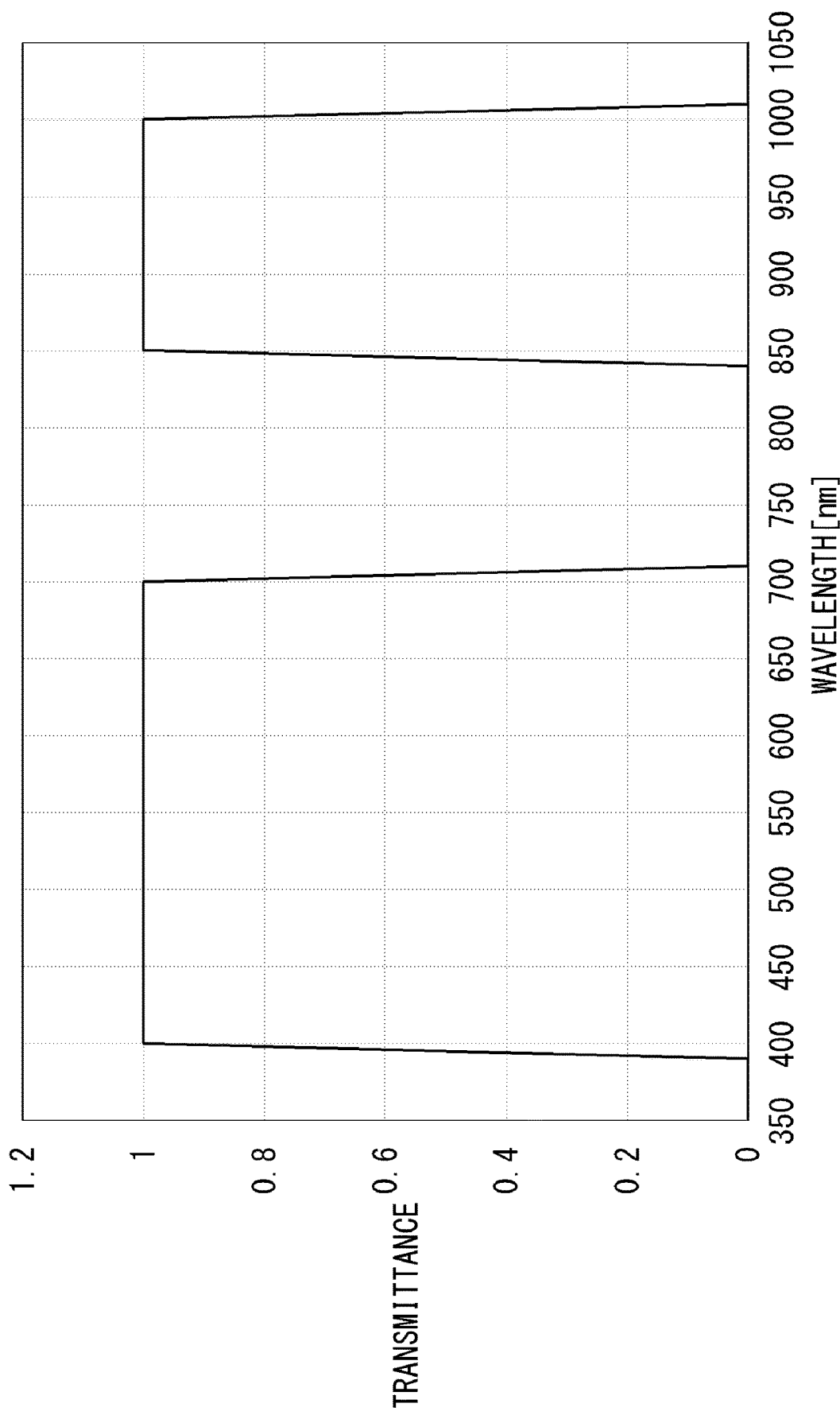
FIG. 3 is a view showing a transmittance characteristic of each wavelength of a DBPF according to the embodiment.

FIG. 3 shows a transmittance characteristic of each wavelength of the DBPF unit 12. In an example shown in FIG. 3, the transmittance characteristic is a characteristic which allows the passage of part of visible light (light having a wavelength of 400 nm to 700 nm) and the passage of part of infrared light (light having a wavelength of 850 nm to 1000 nm). The transmittance characteristic shown in the drawing for separating visible light and infrared light condensed by the lens unit 11 into lights in wavelength bands which are different from each other with the DBPF unit 12 is only an example, and the transmittance characteristic may be any transmittance characteristic which can satisfy an arithmetic expression which allows separation between a visible light component and an infrared light component. The detail of the arithmetic expression will be described later.

FIG. 4 schematically shows the color filter array of the image sensor unit 13 in the first embodiment. As shown in FIG. 4, when a pixel array of two columns×two rows is assumed to be one unit of a pixel area including a plurality of rows and a plurality of columns, an R+IR pixel 41 and a B+IR pixel 44 are included in the unit, and the R+IR pixel 41 and the B+IR pixel 44 are disposed so as to be positioned diagonally. In addition, a W+IR pixel 42 and a W+2IR pixel 43 are included in the unit, and the W+IR pixel 42 and the W+2IR pixel 43 are disposed so as to be positioned diagonally. Note that the W+2IR pixel 43 is provided as an example of a first pixel, and the W+IR pixel 42 is provided as an example of a second pixel.

Figure 5:
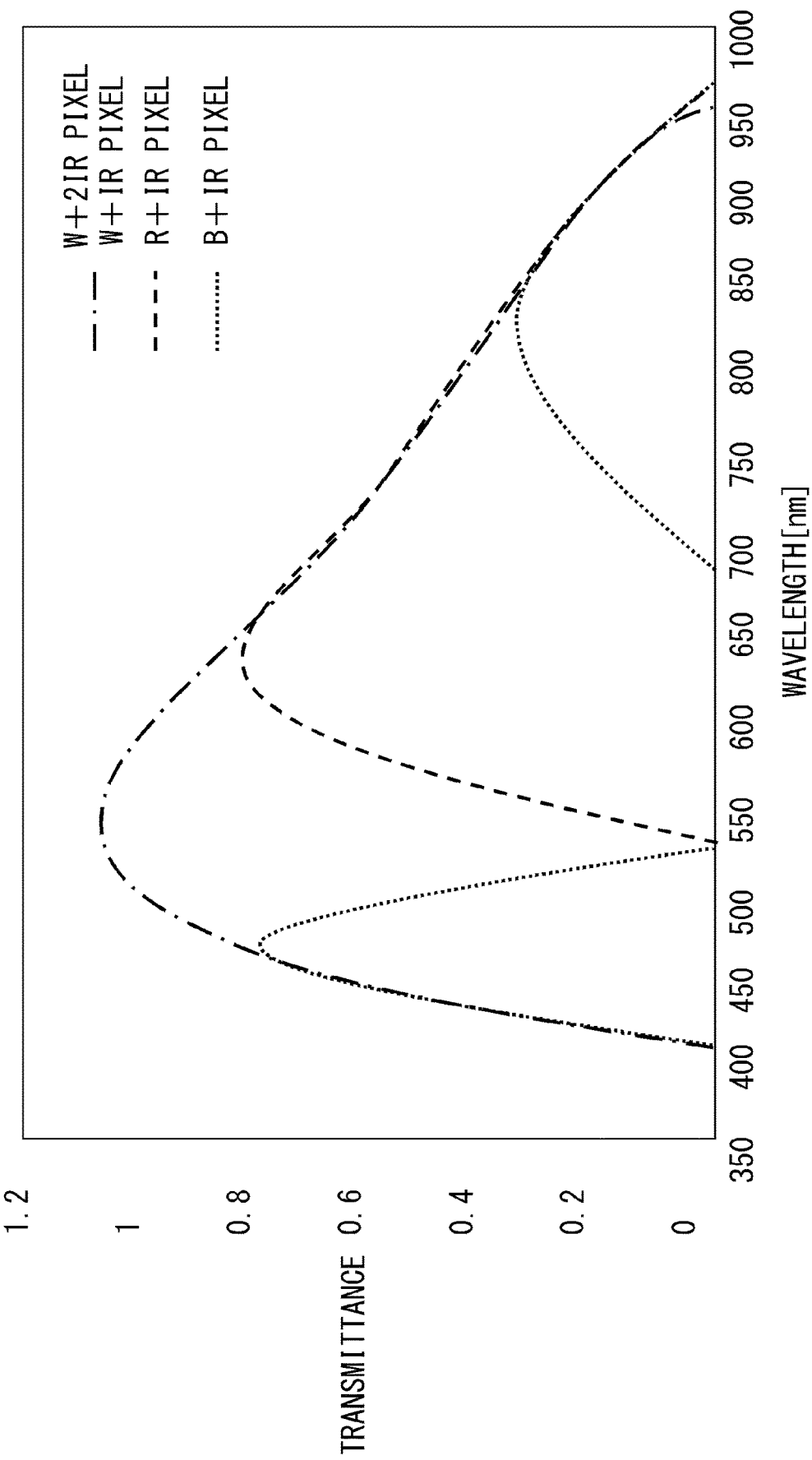
FIG. 5 is a view showing the transmittance characteristic of each wavelength of a color filter according to the embodiment.

FIG. 5 shows the transmittance characteristic of each wavelength of each color filter of the image sensor unit 13 in the first embodiment. As shown in FIG. 5, the B+IR pixel 44 has the transmittance characteristic which allows the passage of light having a wavelength of 400 nm to 550 nm and light having a wavelength of 700 nm to 1000 nm. In addition, the R+IR pixel 41 has the transmittance characteristic which allows the passage of light having a wavelength of 550 nm to 1000 nm. Further, each of the W+IR pixel 42 and the W+2IR pixel 43 has the transmittance characteristic which allows the passage of light of 400 nm to 1000 nm which includes the wavelength band of visible light serving as a first wavelength band and the wavelength band of infrared light serving as a second wavelength band. An example of visible light in the first wavelength band is white light.

Figure 6B:
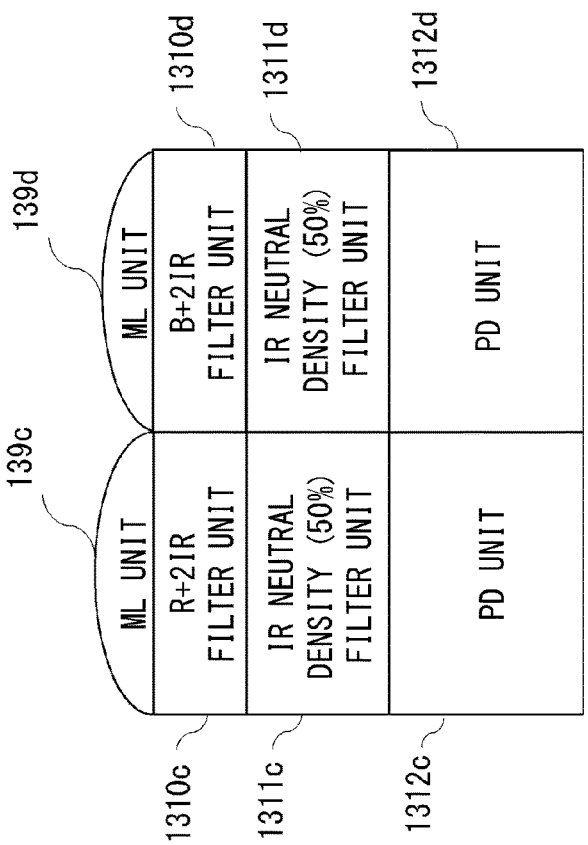
FIGS. 6A and 6B are views simply showing cross sections of pixels of the image sensor unit according to the embodiment.
Figure 6A:
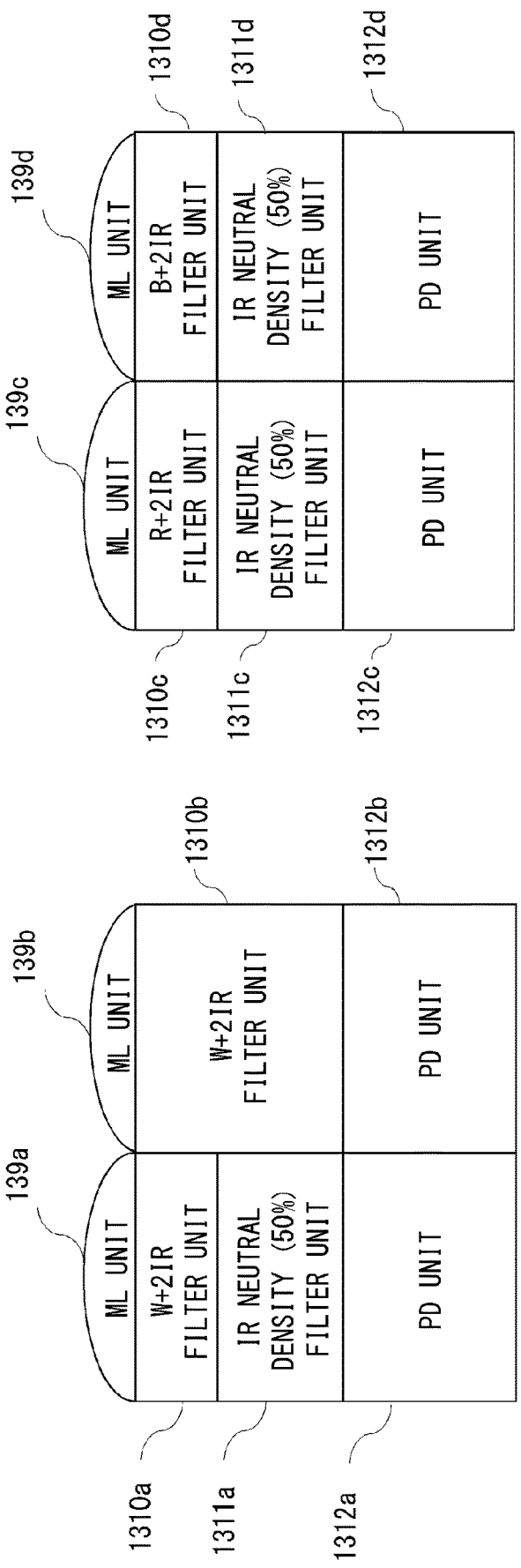

FIGS. 6A and 6B show schematic views of cross-sectional structures of four pixels which are the W+IR pixel 42 and the W+2IR pixel 43 (FIG. 6A), and the R+IR pixel 41 and the B+IR pixel 44 (FIG. 6B) which are included in the image sensor unit 13. Note that a microlens (ML) unit 139a is an optical system for efficiently performing light condensing to the W+IR pixel 42. A W+2IR filter unit 1310a is a filter which allows the passage of, out of light condensed in the ML unit 139a, light in a wavelength band from visible light to infrared light shown in FIG. 5. Note that the W+2IR filter unit 1310a is a second filter which allows the passage of visible light in the first wavelength band and infrared light in the second wavelength band. An infrared neutral density filter unit 1311a is a filter having a transmittance which reduces infrared light having passed through the W+2IR filter unit 1310a, and reduces sensitivity to infrared light by half. Note that the infrared neutral density filter unit 1311a is an example of a first light reduction unit which reduces infrared light having passed through the second filter. A photodiode (PD) unit 1312a converts light having passed through the infrared neutral density filter unit 1311a into electrical charge.

In addition, an ML unit 139b is an optical system for efficiently performing light condensing to the W+2IR pixel 43. A W+2IR filter unit 1310b is a filter which allows the passage of, out of light condensed in the ML unit 139b, light in the wavelength band from visible light to infrared light shown in FIG. 5. Note that the W+2IR filter unit 1310b is a first filter which allows the passage of visible light in the first wavelength band and infrared light in the second wavelength band. A PD unit 1312b converts light having passed through the W+2IR filter unit 1310b into electrical charge. With the structure described above, in one unit of the pixel area, the W+2IR pixel 43 has IR sensitivity which is twice as high as that of the W+IR pixel 42.

In addition, ML units 139c and 139d are optical systems for efficiently performing light condensing to the R+IR pixel 41 and the B+IR pixel 44, respectively. An R+2IR filter unit 1310c and a B+2IR filter unit 1310d are filters which allow the passage of, out of light condensed in the ML units 139c and 139d, light in the wavelength band from visible light to infrared light shown in FIG. 5. Note that each of the R+2IR filter unit 1310c and the B+2IR filter unit 1310d is a third filter which allows the passage of visible light in the first wavelength band and infrared light in the second wavelength band. Infrared neutral density filter units 1311c and 1311d are filters having the transmittances which reduce infrared lights having passed through the R+2IR filter unit 1310c and the B+2IR filter unit 1310d, and reduce sensitivity to infrared light by half. Note that each of the infrared neutral density filter units 1311c and 1311d is an example of a second light reduction unit which reduces infrared light having passed through the third filter. Thus, the infrared neutral density filter units 1311c and 1311d are provided also in the R+IR pixel 41 and the B+IR pixel 44 other than the W+IR pixel 42 and the W+2IR pixel 43. In addition, the light reduction rate of each of the infrared neutral density filter units 1311c and 1311d serving as the light reduction units provided in the R+IR pixel 41 and the B+IR pixel 44 is equal to the light reduction rate of the infrared neutral density filter unit 1311a. PD units 1312c and 1312d convert lights having passed through the infrared neutral density filter units 1311c and 1311d into electrical charge.

Note that, in the present embodiment, as shown in FIGS. 6A and 6B, a structure in which the infrared neutral density filter is stacked on the PD as means for providing a difference in infrared sensitivity is adopted, but other structures may also be adopted. That is, for example, a structure in which, by providing a difference in the depth of impurity implantation for photoelectric conversion of the PD, a desired difference is provided in the sensitivity to infrared light may also be adopted. For example, the W+2IR pixel 43 is provided as an example of a third pixel, and the W+IR pixel 42 is provided as an example of a fourth pixel. In addition, the W+2IR filter unit 1310a is used as a fourth filter which allows the passage of visible light in a third wavelength band and infrared light in a fourth wavelength band. Further, the W+2IR filter unit 1310b is used as a fifth filter which allows the passage of visible light in the third wavelength band and infrared light in the fourth wavelength band. In addition, the PD unit 1312b is used as a first photoelectric conversion unit, and the PD unit 1312a is used as a second photoelectric conversion unit. At this point, it is possible to provide a difference in infrared sensitivity between the PD units by providing a difference between the depth of impurity implantation in the PD unit 1312b and the depth of impurity implantation in the PD unit 1312a. Further, each of the R+2IR filter unit 1310c and the B+2IR filter unit 1310d serves as a sixth filter which allows the passage of visible light in the third wavelength band and infrared light in the fourth wavelength band.

Figure 7:
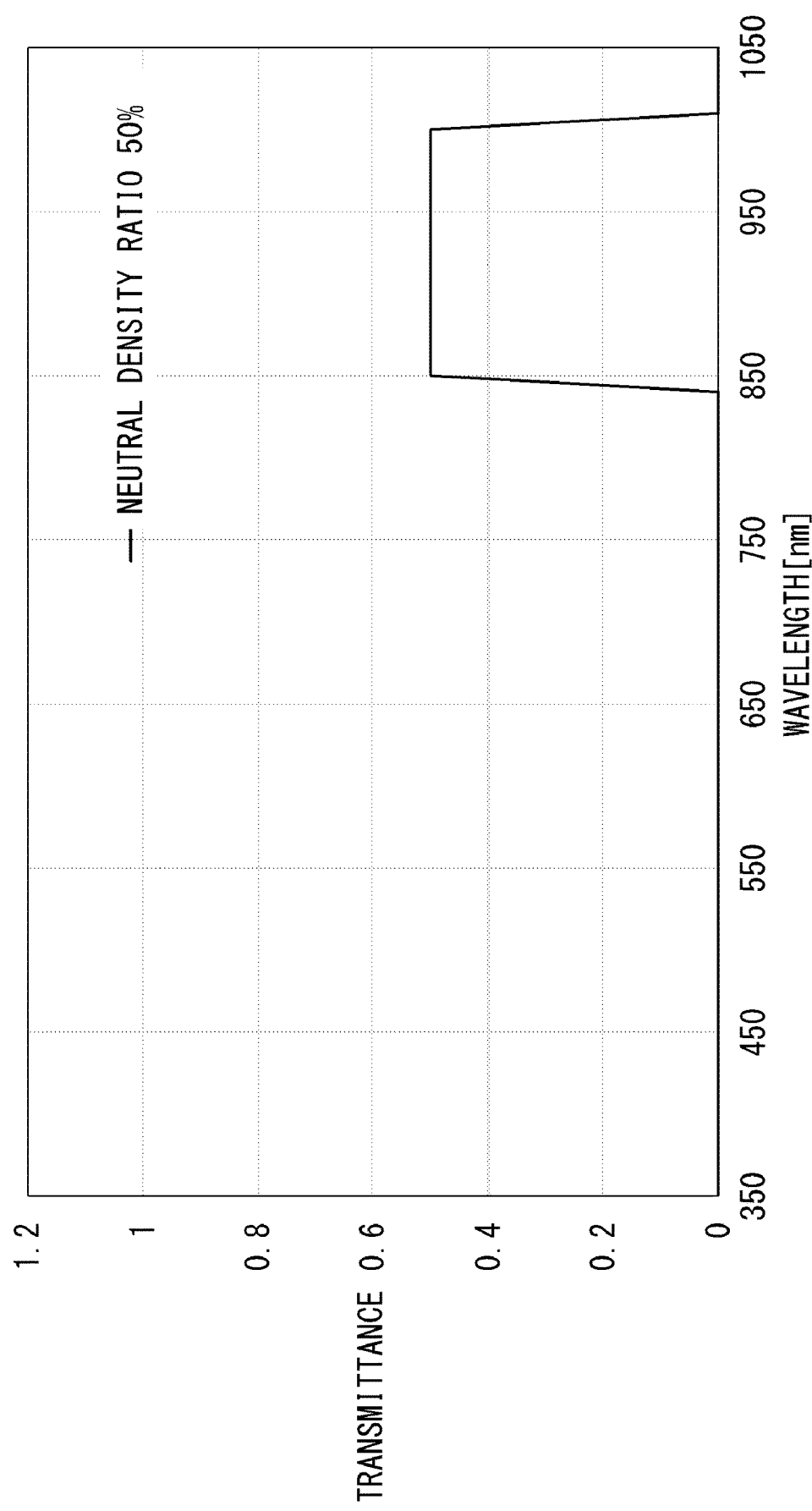
FIG. 7 is a view showing the transmittance characteristic of each wavelength of an infrared neutral density filter according to the embodiment.

FIG. 7 shows the transmittance characteristic of each wavelength of each of the infrared neutral density filters stacked on the R+IR pixel 41, the W+IR pixel 42, and the B+IR pixel 44 of the image sensor unit 13. In addition, though the depiction thereof is omitted, the transmittance of light reaching each of the individual PD units 1312a, 1312c, and 1312d is a product of the transmittance shown in FIG. 3, the transmittance shown in FIG. 5, and the transmittance shown in FIG. 7.

(Arithmetic Calculation) Image data generated by the image sensor unit 13 including the R+IR pixel 41, the W+IR pixel 42, the W+2IR pixel 43, and the B+IR pixel 44 described above is transmitted to the processor unit 14. The processor unit 14 includes at least the image data separation unit 141 which performs separation between the visible light image and the infrared light image. In addition, in the present embodiment, the image data separation unit 141 is included in the processor unit 14, but may also be included in the image sensor unit 13.

Figure 8:
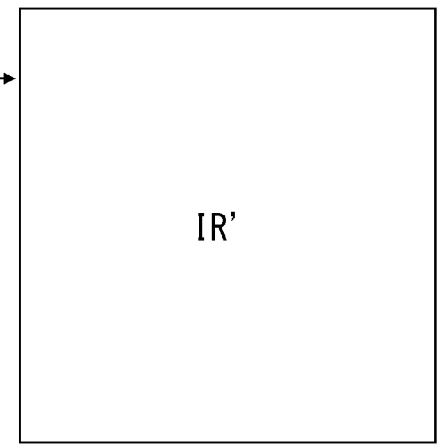
FIG. 8 is a view schematically showing separation between a visible light image and an infrared light image in the embodiment.

Hereinbelow, a description will be given of an example of processing executed by the image data separation unit 141 in the first embodiment. As shown in FIG. 8, pixel values of pixels after the separation between the visible light image and the infrared light image are denoted by R', G21', G12', B', and IR'. By performing addition and subtraction by using the following expressions (1-1) to (1-6), it is possible to separate the pixel values of the individual pixels into the pixel values R', G21', G12', B', and IR'.

$$G=W-(R+B) \tag{1-1}$$

$$IR'=(W+2IR)-(W+IR) \tag{1-2}$$

$$R'=(R+IR)-IR' \tag{1-3}$$

$$B'=(B+IR)-IR' \tag{1-4}$$

$$G12'=(W+IR)-IR' \tag{1-5}$$

$$G21'=(W+2IR)-\{(R+IR)+(B+IR)\} \tag{1-6}$$

Herein, it is assumed that the transmittance characteristics shown in FIGS. 3, 5, and 7 are set such that the above expression (1-1) is satisfied.

(Effect) The photoelectric conversion element according to the present embodiment is different from a conventional photoelectric conversion element which is configured to acquire the visible light image and the infrared light image concurrently in that the IR pixel and the G pixel are replaced with the W pixels. With this configuration, in the photoelectric conversion element according to the present embodiment, information which can be used for the generation of the visible light image is increased as compared with the conventional photoelectric conversion element, i.e., it is possible to achieve increases in the resolution and the sensitivity of a captured image.

In addition, according to the photoelectric conversion element of the present embodiment, as compared with a conventional color filter array, it is possible to implement the separation between the visible light image and the infrared light image more easily, and higher color reproducibility is obtained when a color image is generated from the visible light image. In addition, in the photoelectric conversion element of the present embodiment, the IR components are included in the pixel values obtained from all pixels, and hence, even in the case where the color image is generated without separating visible light and infrared light from each other, an increase in sensitivity can be expected to be achieved. For example, in the photoelectric conversion element of the present embodiment, edge detection performance can be expected to be improved in a low-illuminance photographing environment in night-time photographing or the like.

Second Embodiment (Configuration) Next, the photoelectric conversion device 1 according to a second embodiment will be described with reference to FIGS. 1, 3, 5, 7, 9, 10A and 10B. An example of the configuration of the photoelectric conversion device 1 according to the second embodiment is the same as that of the photoelectric conversion device 1 according to the first embodiment shown in FIG. 1. In addition, the transmittance characteristic of each wavelength of the DBPF unit 12 of the photoelectric conversion device 1 according to the second embodiment is the transmittance characteristic shown in FIG. 3. Further, the circuit diagram showing an example of the configuration of the image sensor unit 13 of the photoelectric conversion device 1 according to the second embodiment and the transmittance characteristic of each color filter stacked on the pixel are the same as those shown in FIGS. 2 and 5. In addition, in the photoelectric conversion device 1 according to the second embodiment, the transmittance characteristic of the infrared neutral density filter stacked on the pixel of the image sensor unit 13 serving as the photoelectric conversion element is the transmittance characteristic shown in FIG. 7.

In the photoelectric conversion device 1 according to the second embodiment, the configurations of the color filter and the infrared neutral density filter which are stacked on the pixels of the image sensor unit 13 are different from those in the first embodiment. In addition, the arithmetic expressions used by the image data separation unit 141 of the photoelectric conversion device 1 according to the second embodiment are different from the arithmetic expressions in the first embodiment.

Figure 9:
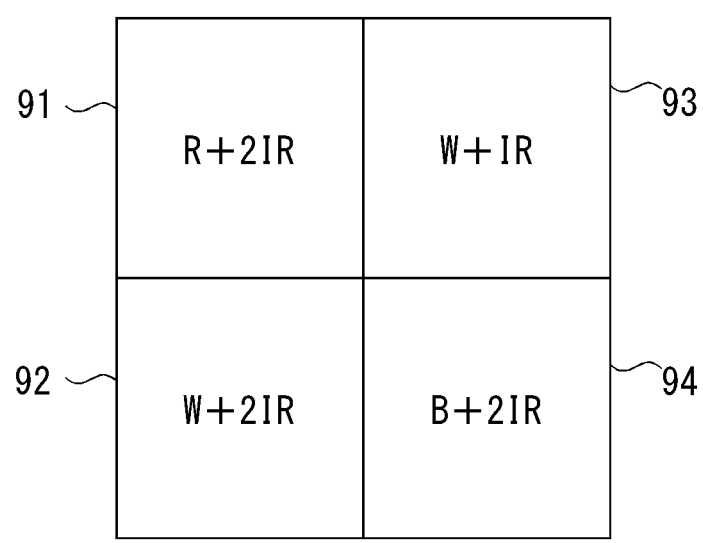
FIG. 9 is a view showing the color filter array of the image sensor unit according to an embodiment.

FIG. 9 shows the color filter array of the image sensor unit 13 in the second embodiment. When the pixel array of two columns×two rows is assumed to be one unit of the pixel area, an R+2IR pixel 91 and a B+2IR pixel 94 are included in the unit, and the R+2IR pixel 91 and the B+2IR pixel 94 are disposed so as to be positioned diagonally. In addition, a W+2IR pixel 92 and a W+IR pixel 93 are included in the unit, and the W+2IR pixel 92 and the W+IR pixel 93 are disposed so as to be positioned diagonally.

FIGS. 10A and 10B show schematic views of cross-sectional structures of the W+2IR pixel 92 and the W+IR pixel 93 (FIG. 10A), and the R+2IR pixel 91 and the B+2IR pixel 94 (FIG. 10B) which are included in the image sensor unit 13. An ML unit 139e is an optical system for efficiently performing light condensing to the W+IR pixel 93. A W+2IR filter unit 1310e is a filter which allows the passage of, out of light condensed in the ML unit 139e, light in the wavelength band from visible light to infrared light shown in FIG. 5. An infrared neutral density filter unit 1311e is a filter having the transmittance which reduces infrared light having passed through the W+2IR filter unit 1310e, and reduces sensitivity to infrared light by half. A PD unit 1312e converts light having passed through the infrared neutral density filter unit 1311e into electrical charge.

In addition, an ML unit 139f is an optical system for efficiently performing light condensing to the W+2IR pixel 92. A W+2IR filter unit 1310f is a filter which allows the passage of, out of light condensed in the ML unit 139f, light in the wavelength band from visible light to infrared light shown in FIG. 5. A PD unit 1312f converts light having passed through the W+2IR filter unit 1310f into electrical charge. With the structure described above, in one unit of the pixel area, the W+2IR pixel 92 has the IR sensitivity which is twice as high as that of the W+IR pixel 93.

In addition, an ML unit 139g is an optical system for efficiently performing light condensing to the R+2IR pixel 91. An R+2IR filter unit 1310g is a filter which allows the passage of, out of light condensed in the ML unit 139g, light in the wavelength band from visible light to infrared light shown in FIG. 5. A PD unit 1312g converts light having passed through the R+2IR filter unit 1310g into electrical charge. In addition, an ML unit 139h is an optical system for efficiently performing light condensing to the B+2IR pixel 94. A B+2IR filter unit 1310h is a filter which allows the passage of, out of light condensed in the ML unit 139h, light in the wavelength band from visible light to infrared light shown in FIG. 5. A PD unit 1312h converts light having passed through the B+2IR filter unit 1310h into electrical charge. Consequently, similarly to the W+2IR pixel 92, each of the R+2IR pixel 91 and the B+2IR pixel 94 has a structure in which the infrared neutral density filter is "not" stacked.

The transmittance characteristic of each wavelength of the infrared neutral density filter stacked on the W+IR pixel 93 of the image sensor unit 13 in the present embodiment is the same as that in the first embodiment, as shown in FIG. 7. Note that the transmittance of light reaching the PD unit 1312e is a product of the transmittance shown in FIG. 3, the transmittance shown in FIG. 5, and the transmittance shown in FIG. 7.

(Arithmetic Calculation) Image data generated by the image sensor unit 13 including the R+2IR pixel 91, the W+2IR pixel 92, the W+IR pixel 93, and the B+2IR pixel 94 described above is transmitted to the processor unit 14. The processor unit 14 includes at least the image data separation unit 141 which performs separation between the visible light image and the infrared light image. In addition, in the present embodiment, the image data separation unit 141 is included in the processor unit 14, but may also be included in the image sensor unit 13.

Figure 11:
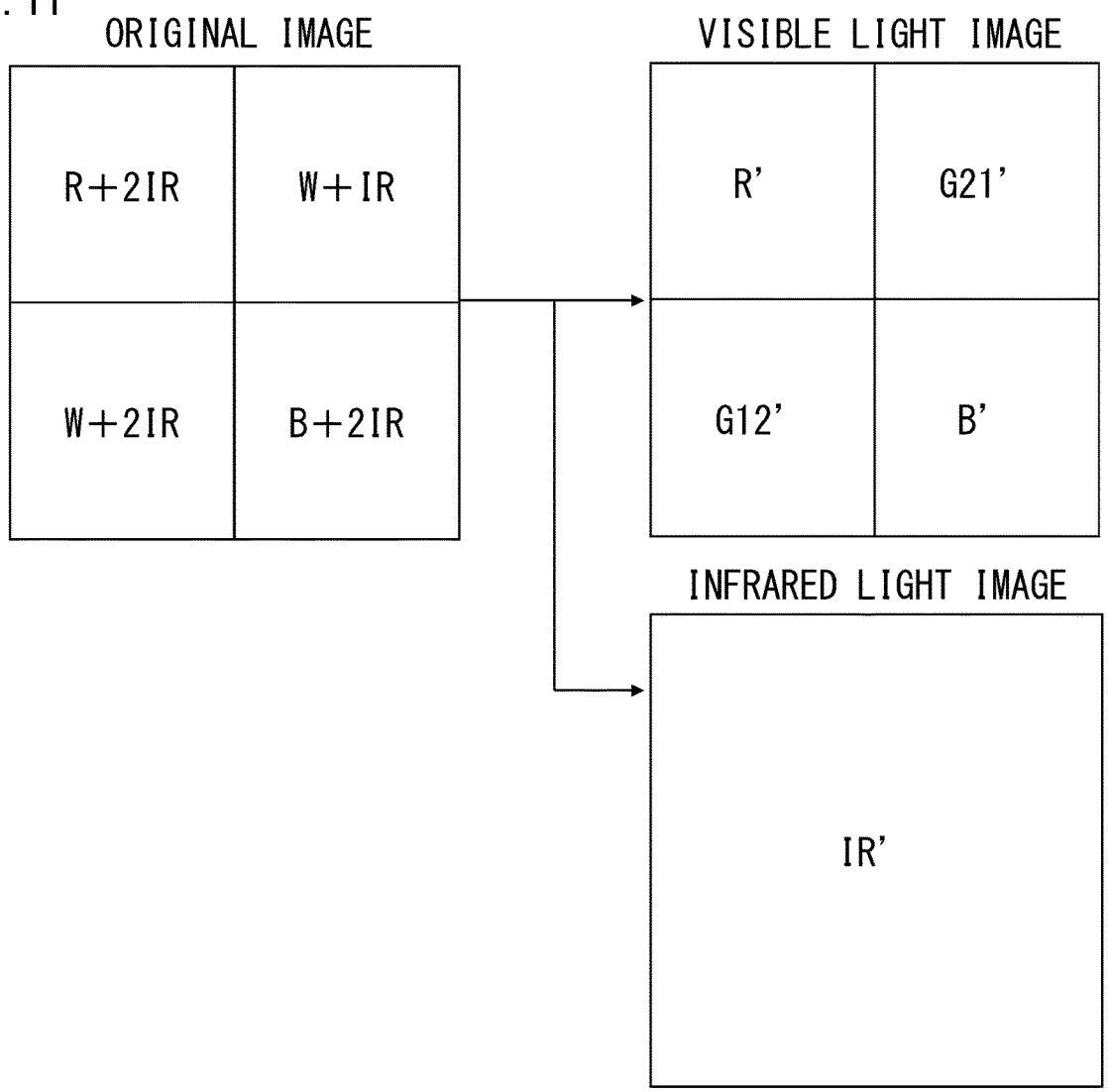
FIG. 11 is a view schematically showing the separation between the visible light image and the infrared light image in the embodiment.

Hereinbelow, a description will be given of an example of processing executed by the image data separation unit 141 in the second embodiment. As shown in FIG. 11, the pixel values of the pixels after the separation between the visible light image and the infrared light image are denoted by R', G21', G12', B', and IR'. By performing addition and subtraction by using the expression (1-1) and the following expressions (2-1) to (2-5), it is possible to separate the pixel values of the individual pixels into the pixel values R', G21', G12', B', and IR'.

$$IR'=(W+2IR)-(W+IR) \quad (2\text{-}1)$$

$$R'=(R+2IR)-2IR' \quad (2\text{-}2)$$

$$B'=(B+2IR)-2IR' \quad (2\text{-}3)$$

$$G12'=(W+2IR)-2IR' \quad (2\text{-}4)$$

$$G21'=(W+2IR)-2IR' \quad (2\text{-}5)$$

Herein, it is assumed that the transmittance characteristics shown in FIGS. 3, 5, and 7 are set such that the above expression (1-1) is satisfied.

(Effect) The photoelectric conversion element according to the present embodiment is different from the conventional photoelectric conversion element which is configured to acquire the visible light image and the infrared light image concurrently in that the IR pixel and the G pixel are replaced with the W pixels. With this configuration, in the photoelectric conversion element according to the present embodiment, information which can be used for the generation of the visible light image is increased as compared with the conventional photoelectric conversion element, i.e., it is possible to achieve increases in the resolution and the sensitivity of the captured image. Further, in the photoelectric conversion element according to the present embodiment, the IR sensitivity in one unit is improved as compared with the first embodiment, and hence the infrared light image having higher sensitivity can be expected to be generated.

Third Embodiment (Configuration) Next, the photoelectric conversion device 1 according to a third embodiment will be described with reference to FIGS. 1, 3, 5, 12, 13, 14A, 14B, 15, and 16. An example of the configuration of the photoelectric conversion device 1 according to the third embodiment is the same as that of the photoelectric conversion device 1 according to the first embodiment shown in FIG. 1. In addition, the transmittance characteristic of each wavelength of the DBPF unit 12 of the photoelectric conversion device 1 according to the third embodiment is the transmittance characteristic shown in FIG. 3. Further, in the photoelectric conversion device 1 according to the third embodiment, the circuit diagram showing an example of the configuration of the image sensor unit 13 serving as the photoelectric conversion element and the transmittance characteristic of each color filter stacked on the pixel are the same as those shown in FIGS. 2 and 5.

In the photoelectric conversion device 1 according to the third embodiment, the configuration of the infrared neutral density filter stacked on the pixel of the image sensor unit 13 is different from that in the first embodiment. In addition, the configurations of the color filter and the infrared neutral density filter which are stacked on the pixels of the image sensor unit 13 of the photoelectric conversion device 1 according to the third embodiment are different from those in the first embodiment. Further, the arithmetic expressions used by the image data separation unit 141 of the photoelectric conversion device 1 according to the third embodiment are different from the arithmetic expressions in the first embodiment.

Figure 12:
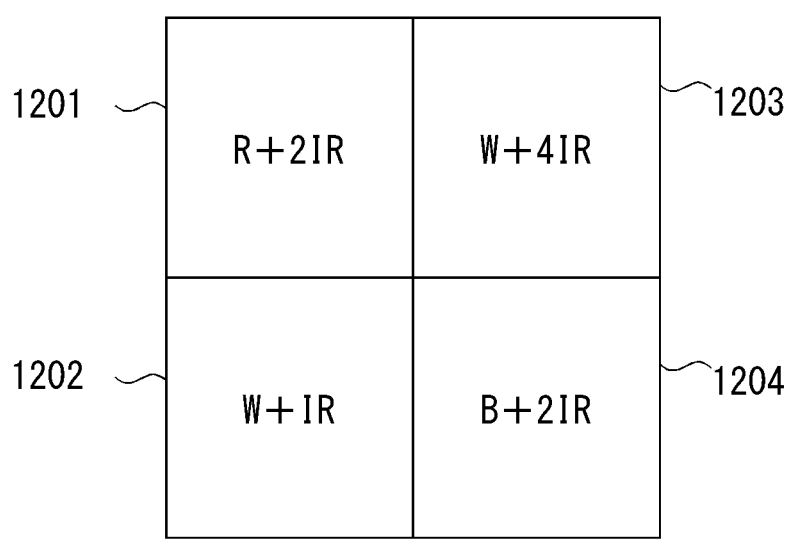
FIG. 12 is a view showing the color filter array of the image sensor unit according to an embodiment.

FIG. 12 shows the color filter array of the image sensor unit 13 in the third embodiment. When the pixel array of two columns×two rows is assumed to be one unit of the pixel area, an R+2IR pixel 1201 and a B+2IR pixel 1204 are included in the unit, and the R+2IR pixel 1201 and the B+2IR pixel 1204 are disposed so as to be positioned diagonally. In addition, a W+IR pixel 1202 and a W+4IR pixel 1203 are included in the unit, and the W+IR pixel 1202 and the W+4IR pixel 1203 are disposed so as to be positioned diagonally.

Figure 13:
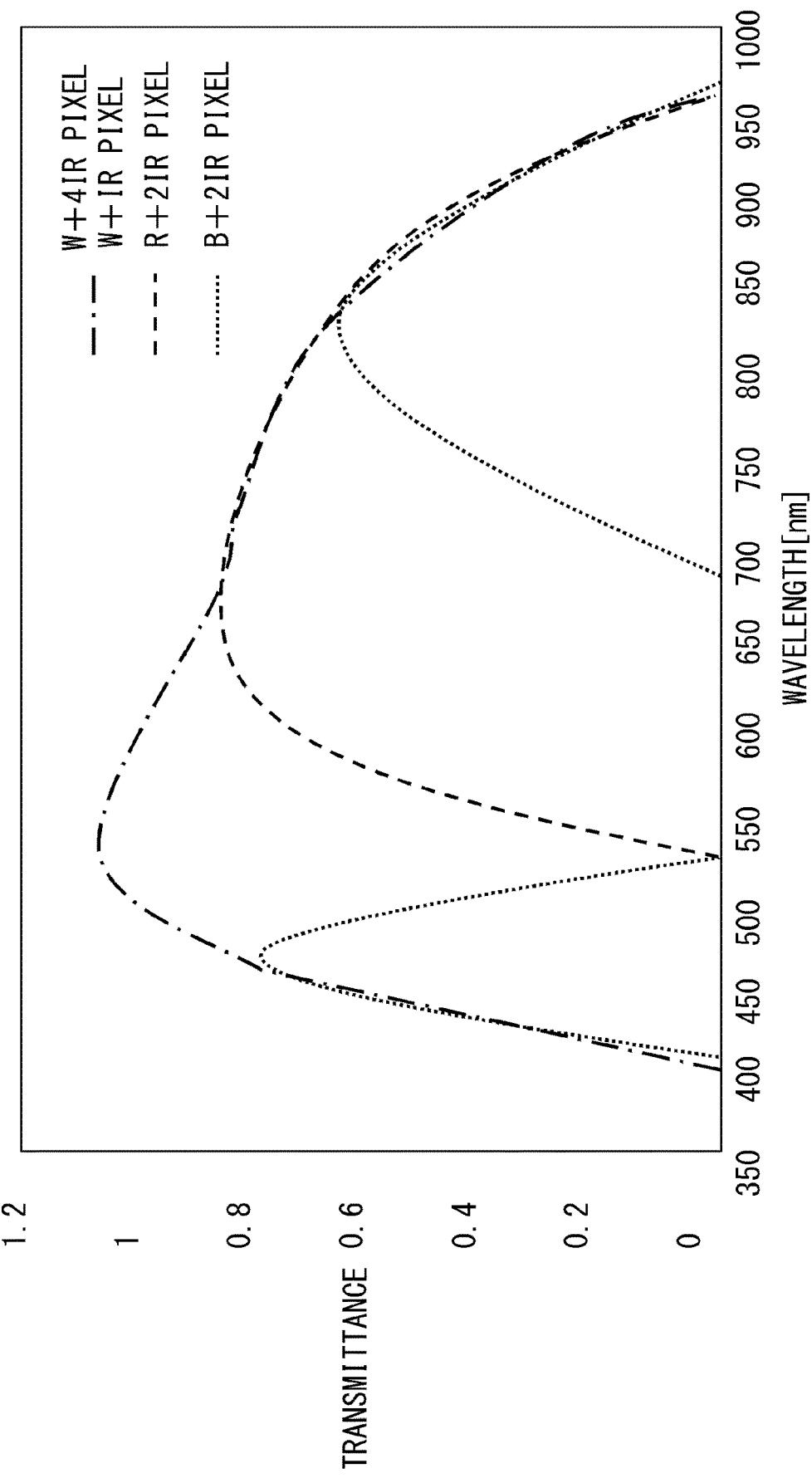
FIG. 13 is a view showing the transmittance characteristic of each wavelength of the color filter according to the embodiment.

FIG. 13 shows the transmittance characteristic of each wavelength of each color filter of the image sensor unit 13 in the third embodiment. As shown in FIG. 13, the R+2IR pixel 1201 has the transmittance characteristic which allows the passage of light having a wavelength of 550 nm to 1000 nm. In addition, the B+2IR pixel 1204 has the transmittance characteristic which allows the passage of light having a wavelength of 400 nm to 550 nm and light having a wavelength of 750 nm to 1000 nm. Further, each of the W+IR pixel 1202 and the W+4IR pixel 1203 has the transmittance characteristic which allows the passage of light having a wavelength of 400 nm to 1000 nm. The IR sensitivity in the third embodiment is twice as high as that in the first embodiment.

Figure 14A:
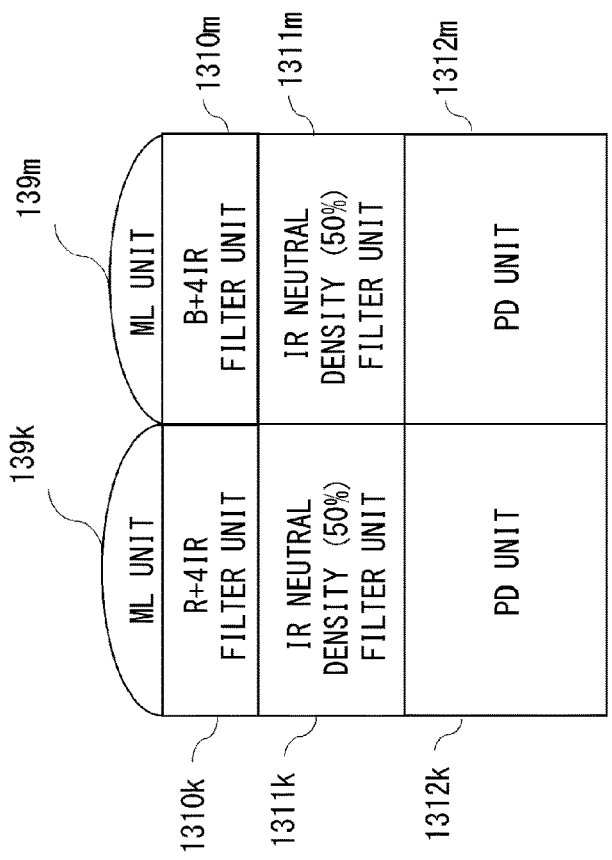
FIGS. 14A and 14B are views showing the cross sections of the pixels of the image sensor unit according to the embodiment.
Figure 14B:
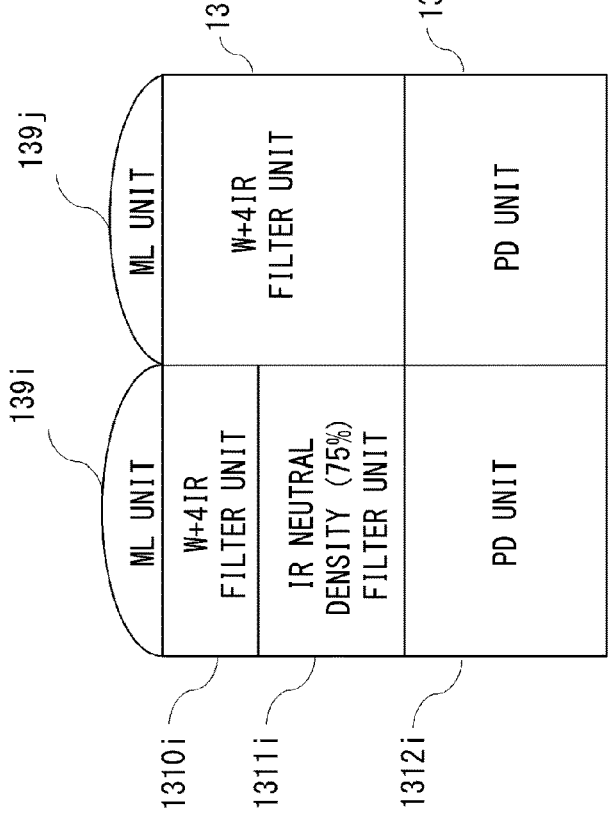

FIGS. 14A and 14B show schematic views of cross-sectional structures of the W+IR pixel 1202 and the W+4IR pixel 1203 (FIG. 14A), and the R+2IR pixel 1201 and the B+2IR pixel 1204 (FIG. 14B) which are included in the image sensor unit 13. An ML unit 139*i* is an optical system for efficiently performing light condensing to the W+IR pixel 1202. A W+4IR filter unit 1310*i* is a filter which allows the passage of, out of light condensed in the ML unit 139*i*, light in a wavelength band from visible light to infrared light shown in FIG. 13. An infrared neutral density filter unit 1311*i* is a filter having the transmittance which reduces infrared light having passed through the W+4IR filter unit 1310*i*, and reduces sensitivity to infrared light to ¼. A PD unit 1312*i* converts light having passed through the infrared neutral density filter unit 1311*i* into electrical charge.

In addition, an ML unit 139*j* is an optical system for efficiently performing light condensing to the W+4IR pixel 1203. A W+4IR filter unit 1310*j* is a filter which allows the passage of, out of light condensed in the ML unit 139*j*, light in the wavelength band from visible light to infrared light shown in FIG. 13. A PD unit 1312*j* converts light having passed through the W+4IR filter unit 1310*j* into electrical charge. With the structure described above, in one unit of the pixel area, the W+4IR pixel 1203 has the IR sensitivity which is four times as high as that of the W+IR pixel 1202.

In addition, an ML unit 139*k* is an optical system for efficiently performing light condensing to the R+2IR pixel 1201. An R+4IR filter unit 1310*k* is a filter which allows the passage of, out of light condensed in the ML unit 139*k*, light in the wavelength band from visible light to infrared light shown in FIG. 13. An infrared neutral density filter unit 1311*k* is a filter having the transmittance which reduces infrared light having passed through the R+4IR filter unit 1310*k*, and reduces sensitivity to infrared light by half. A PD unit 1312*k* converts light having passed through the infrared neutral density filter unit 1311*k* into electrical charge.

In addition, an ML unit 139*m* is an optical system for efficiently performing light condensing to the B+2IR pixel 1204. A B+4IR filter unit 1310*m* is a filter which allows the passage of, out of light condensed in the ML unit 139*m*, light in the wavelength band from visible light to infrared light shown in FIG. 13. An infrared neutral density filter unit 1311*m* is a filter having the transmittance which reduces infrared light having passed through the B+4IR filter unit 1310*m*, and reduces sensitivity to infrared light by half. Consequently, the light reduction rate of each of the infrared neutral density filter units 1311*k* and 1311*m* serving as the light reduction units provided in the R+2IR pixel 1201 and the B+2IR pixel 1204 is lower than the light reduction rate of the infrared neutral density filter unit 1311*i*. A PD unit 1312*m* converts light having passed through the infrared neutral density filter unit 1311*m* into electrical charge.

FIG. 15 shows the transmittance characteristic of each wavelength of each of the infrared neutral density filters stacked on the R+2IR pixel 1201, the W+IR pixel 1202, and the B+2IR pixel 1204 of the image sensor unit 13 in the present embodiment. In addition, the transmittance of light reaching each of the PD units 1312*i*, 1312*k*, and 1312*m* is a product of the transmittance shown in FIG. 3, the transmittance shown in FIG. 13, and the transmittance shown in FIG. 15.

(Arithmetic Calculation) Image data generated by the image sensor unit 13 including the R+2IR pixel 1201, the W+IR pixel 1202, the W+4IR pixel 1203, and the B+2IR pixel 1204 described above is transmitted to the processor unit 14. The processor unit 14 includes at least the image data separation unit 141 which performs separation between the visible light image and the infrared light image. In addition, in the present embodiment, the image data separation unit 141 is included in the processor unit 14, but may also be included in the image sensor unit 13.

Figure 16:
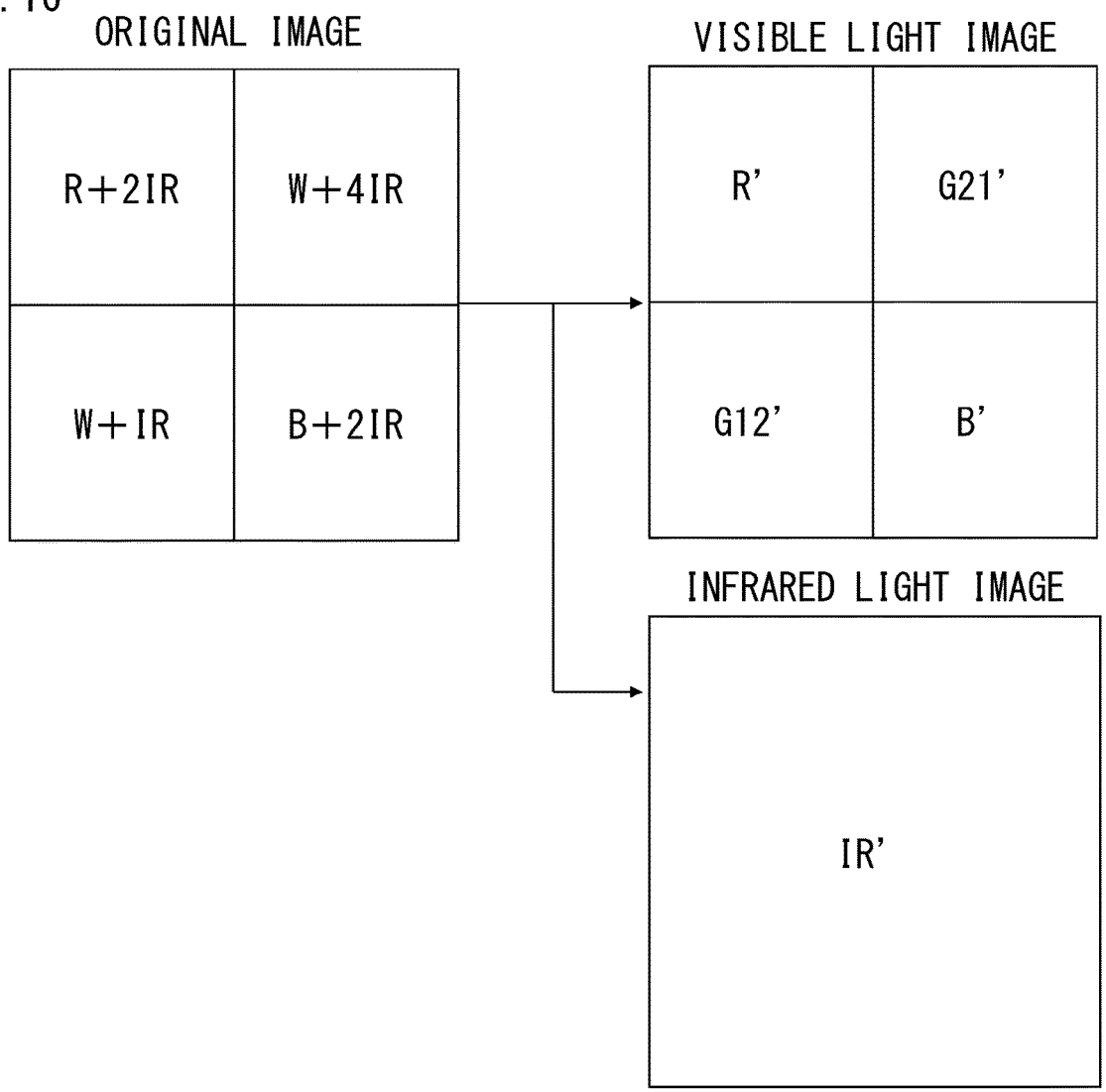
FIG. 16 is a view schematically showing the separation between the visible light image and the infrared light image in the embodiment.

Hereinbelow, a description will be given of an example of processing executed by the image data separation unit 141 in the third embodiment. As shown in FIG. 16, the pixel values of the pixels after the separation between the visible light image and the infrared light image are denoted by R', G21', G12', B', and IR'. By performing addition and subtraction by using the expression (1-1) and the following expressions (3-1) to (3-5), it is possible to separate the pixel values of the individual pixels into the pixel values R', G21', G12', B', and IR'.

$$IR'=\{(W+4IR)-(W+IR)\}/3 \qquad (3\text{-}1)$$

$$R'=(R+2IR)-2IR' \qquad (3\text{-}2)$$

$$B'=(B+2IR)-2IR' \qquad (3\text{-}3)$$

$$G12'=(W+IR)-IR' \qquad (3\text{-}4)$$

$$G21'=(W+4IR)-\{(R+2IR)+(B+2IR)\} \qquad (3\text{-}5)$$

Herein, it is assumed that the transmittance characteristics shown in FIGS. 3, 13, and 15 are set such that the above expression (1-1) is satisfied.

(Effect) Similarly to the first embodiment, the photoelectric conversion element according to the present embodiment is different from the conventional photoelectric conversion element which is configured to acquire the visible light image and the infrared light image concurrently in that the IR pixel and the G pixel are replaced with the W pixels. With this configuration, in the photoelectric conversion element according to the present embodiment, information which can be used for the generation of the visible light image is increased as compared with the conventional photoelectric conversion element, i.e., it is possible to achieve increases in the resolution and the sensitivity of the captured image. Further, in the photoelectric conversion element according to the present embodiment, the IR sensitivity in one unit is improved as compared with the first and second embodiments, and hence the infrared light image having higher sensitivity can be expected to be generated. Further, in the photoelectric conversion element according to the present embodiment, the dynamic range of the IR sensitivity can also be expected to be extended by using a difference in the IR sensitivity.

Fourth Embodiment (Configuration) Next, the photoelectric conversion device 1 according to a fourth embodiment will be described with reference to FIGS. 1, 3, 5, 7, and 17 to 20. An example of the configuration of the photoelectric conversion device 1 according to the fourth embodiment is the same as that of the photoelectric conversion device 1 according to the first embodiment shown in FIG. 1. The transmittance characteristic of each wavelength of the DBPF unit 12 of the photoelectric conversion device 1 according to the fourth embodiment is the transmittance characteristic shown in FIG. 3. In addition, in the photoelectric conversion device 1 according to the fourth embodiment, the circuit diagram showing an example of the configuration of the image sensor unit 13 serving as the photoelectric conversion element and the transmittance characteristic of each color filter stacked on the pixel are the same as those shown in FIGS. 2 and 5.

In the photoelectric conversion device 1 according to the fourth embodiment, the configuration of each color filter stacked on the pixel of the image sensor unit 13 is different from that in the first embodiment. In addition, the configurations of the color filter and the infrared neutral density filter which are stacked on the pixels of the image sensor unit 13 of the photoelectric conversion device 1 according to the fourth embodiment are different from those in the first embodiment. Further, the arithmetic expressions used by the image data separation unit 141 of the photoelectric conversion device 1 according to the fourth embodiment are different from the arithmetic expressions in the first embodiment.

Figure 17:
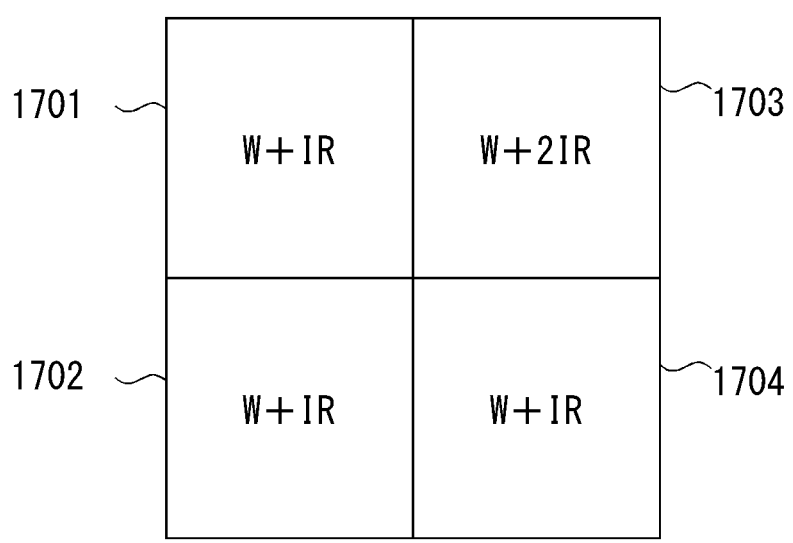
FIG. 17 is a view showing the color filter array of the image sensor unit according to an embodiment.

FIG. 17 shows the color filter array of the image sensor unit 13 in the fourth embodiment. When the pixel array of two columns×two rows is assumed to be one unit of the pixel area, three W+IR pixels 1701, 1702, and 1704 and one W+2IR pixel 1703 are included in the unit.

Figure 18:
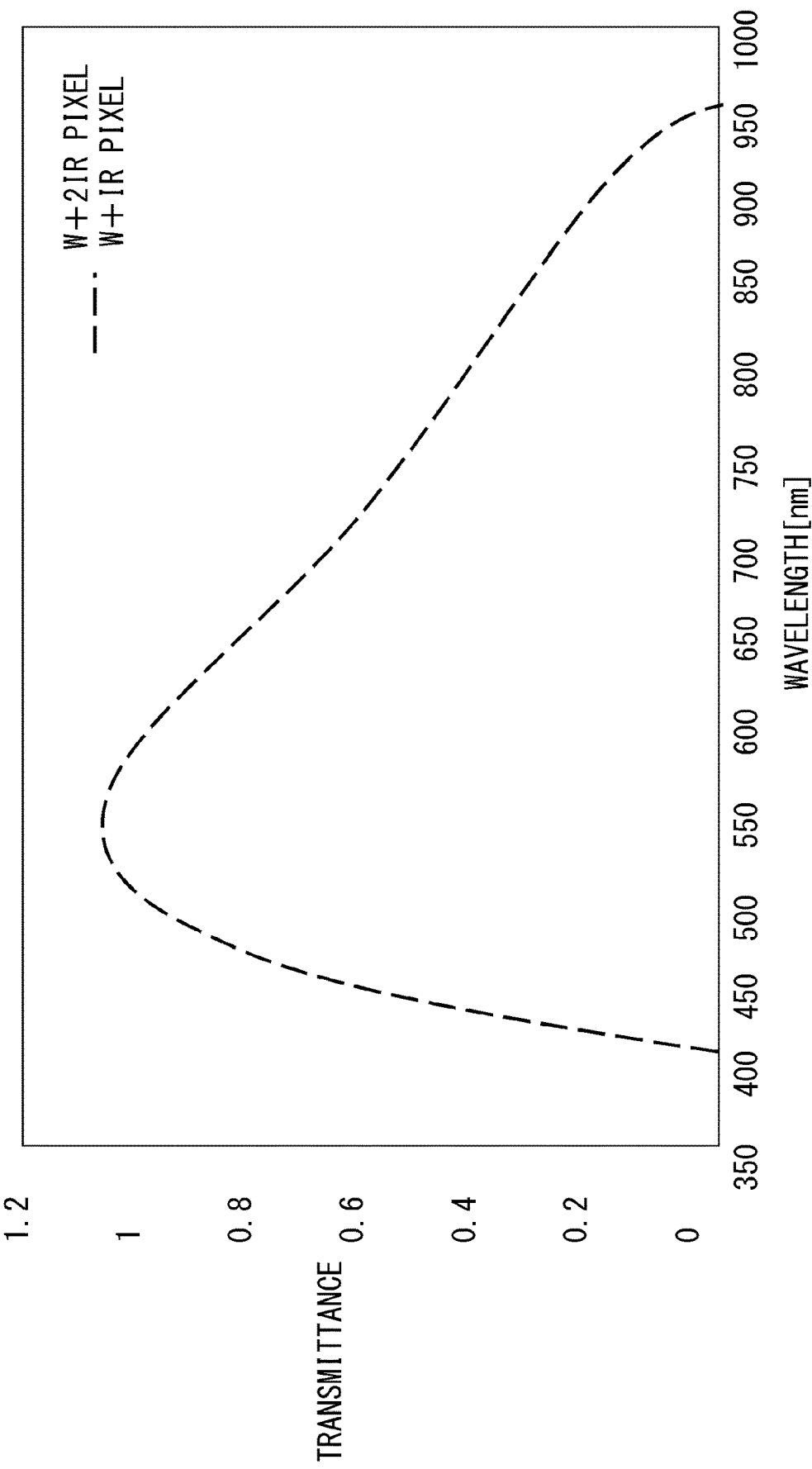
FIG. 18 is a view showing the transmittance characteristic of each wavelength of the color filter according to the embodiment.

FIG. 18 shows the transmittance characteristic of each wavelength of each color filter of the image sensor unit 13 in the fourth embodiment. As shown in FIG. 18, each of the W+IR pixels 1701, 1702, and 1704, and the W+2IR pixel 1703 has the transmittance characteristic which allows the passage of light having a wavelength of 400 nm to 1000 nm.

Figure 19A:
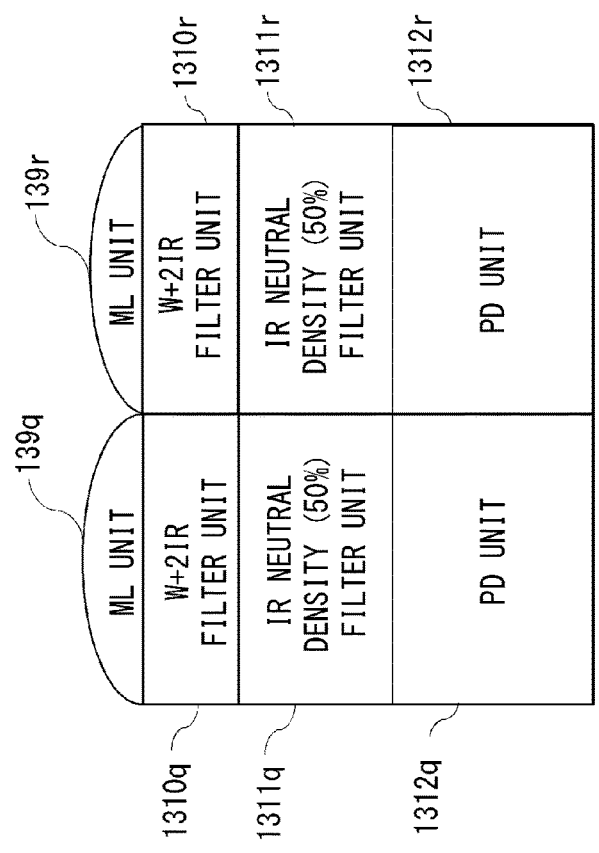
FIGS. 19A and 19B are views showing the cross sections of the pixels of the image sensor unit according to the embodiment.
Figure 19B:
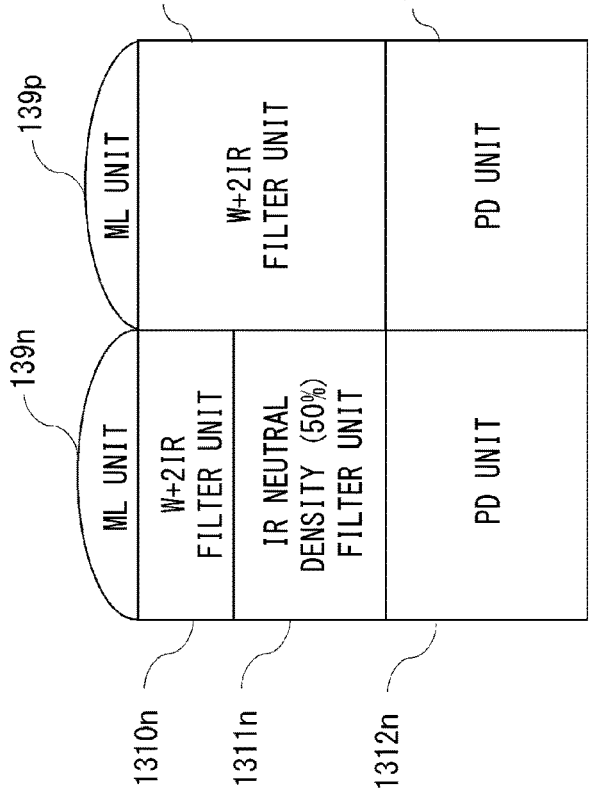

FIGS. 19A and 19B show schematic views of cross-sectional structures of the W+IR pixels 1701, 1702, and 1704, and the W+2IR pixel 1703 which are included in the image sensor unit 13 in the fourth embodiment. ML units 139$n$, 139$q$, and 139$r$ are optical systems for efficiently performing light condensing to the W+IR pixels 1701, 1702, and 1704. W+2IR filter units 1310$n$, 1310$q$, and 1310$r$ are filters which allow the passage of, out of light condensed in the ML units 139$n$, 139$q$, and 139$r$, light in a wavelength band from visible light to infrared light shown in FIG. 18. Infrared neutral density filter units 1311$n$, 1311$q$, and 1311$r$ are filters having the transmittances which reduce infrared light having passed through the W+2IR filter units 1310$n$, 1310$q$, and 1310$r$, and reduce sensitivity to infrared light by half. PD units 1312$n$, 1312$q$, and 1312$r$ convert light having passed through the infrared neutral density filter units 1311$n$, 1311$q$, and 1311$r$ into electrical charge.

In addition, an ML unit 139$p$ is an optical system for efficiently performing light condensing to the W+2IR pixel 1703. A W+2IR filter unit 1310$p$ is a filter which allows the passage of, out of light condensed in the ML unit 139$p$, light in the wavelength band from visible light to infrared light shown in FIG. 18. A PD unit 1312$p$ is a unit which converts light having passed through the W+2IR filter unit 1310$p$ into electrical charge. With the structure described above, in one unit of the pixel area, the W+2IR pixel 1703 has the IR sensitivity which is twice as high as that of each of the W+IR pixels 1701, 1702, and 1704.

The transmittance characteristic of each wavelength of each of the infrared neutral density filters stacked on the W+IR pixels 1701, 1702, and 1704 of the image sensor unit 13 in the present embodiment is the transmittance characteristic shown in FIG. 7. In addition, the transmittance of light reaching each of the PD units 1312$n$, 1312$q$, and 1312$r$ is a product of the transmittance shown in FIG. 3, the transmittance shown in FIG. 7, and the transmittance shown in FIG. 18.

(Arithmetic Calculation) Image data generated by the image sensor unit 13 including the W+IR pixels 1701, 1702, and 1704, and the W+2IR pixel 1703 described above is transmitted to the processor unit 14. The processor unit 14 includes at least the image data separation unit 141 which performs separation between the visible light image and the infrared light image. In addition, in the present embodiment, the image data separation unit 141 is included in the processor unit 14, but may also be included in the image sensor unit 13.

Figure 20:
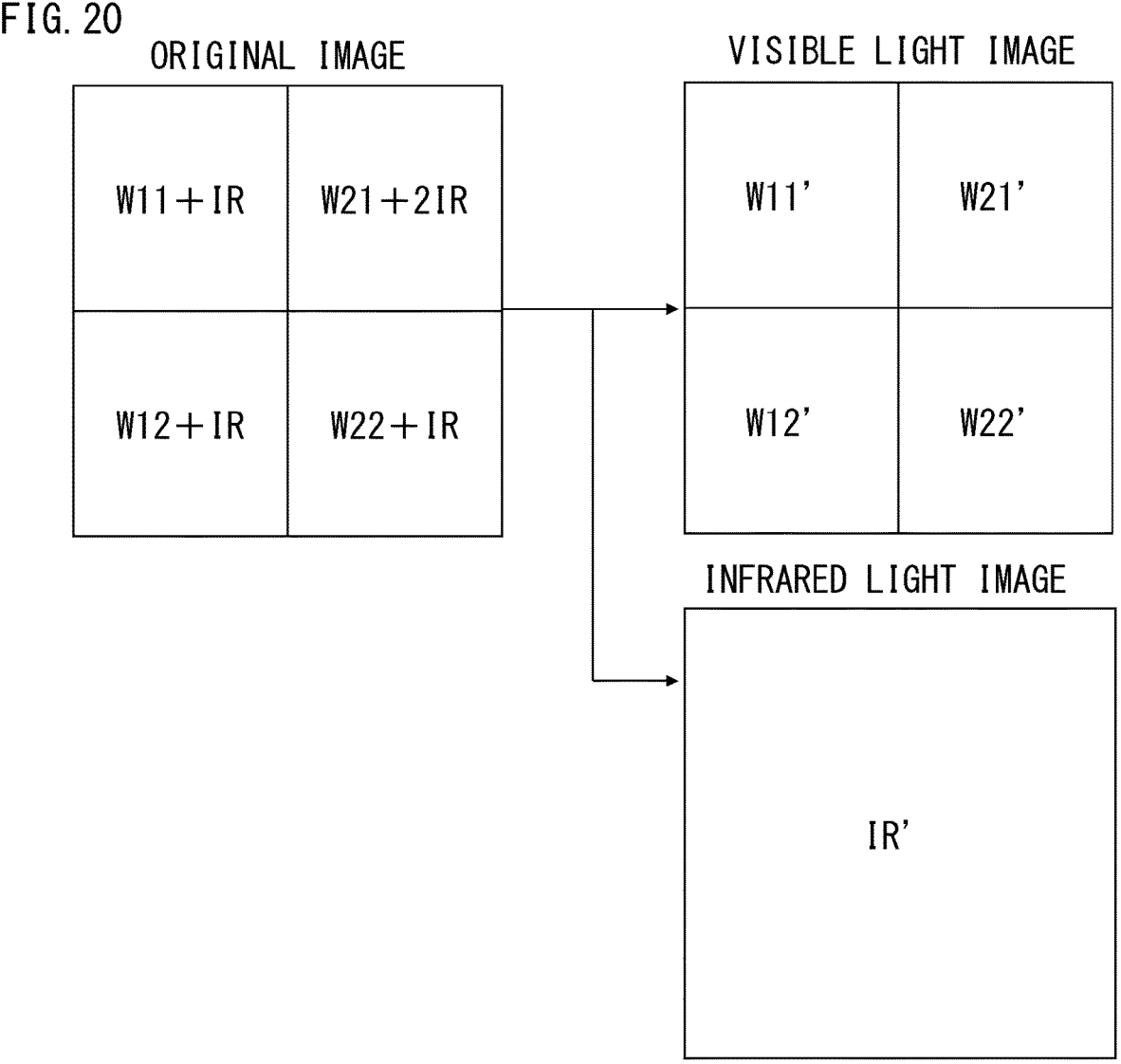
FIG. 20 is a view schematically showing the separation between the visible light image and the infrared light image in the embodiment.

Hereinbelow, a description will be given of an example of processing executed by the image data separation unit 141 in the fourth embodiment. As shown in FIG. 20, the pixel values of the pixels after the separation between the visible light image and the infrared light image are denoted by W11', W21', W12', W22', and IR'. By performing addition and subtraction by using the following expressions (4-1) to (4-5), it is possible to separate the pixel values of the individual pixels into the pixel values W11', W21', W12', W22', and IR'.

$$IR' = (W21+IR) - \{(W11+IR)+(W12+IR)+(W22+IR)\}/3 \quad (4\text{-}1)$$

$$W11' = (W11+IR) - IR' \quad (4\text{-}2)$$

$$W12' = (W12+IR) - IR' \quad (4\text{-}3)$$

$$W22' = (W22+IR) - IR' \quad (4\text{-}4)$$

$$W21' = (W21+2IR) - 2IR' \quad (4\text{-}5)$$

(Effect) The photoelectric conversion element according to the present embodiment is different from the conventional photoelectric conversion element which is constituted by the pixel array of two columns×two rows of, e.g., W, W, W, and IR in that the IR pixel is replaced with the W pixel. With this configuration, in the photoelectric conversion element according to the present embodiment, information which can be used for the generation of the visible light image is increased as compared with the conventional photoelectric conversion element, i.e., it is possible to achieve increases in the resolution and the sensitivity of the captured image.

Fifth Embodiment (Configuration) Next, the photoelectric conversion device 1 according to a fifth embodiment will be described with reference to FIGS. 1, 21, and 22. An example of the configuration of the photoelectric conversion device 1 according to the fifth embodiment is the same as that of the photoelectric conversion device 1 according to the first embodiment shown in FIG. 1. In addition, in the photoelectric conversion device 1 according to the fifth embodiment, as the array and the transmittance characteristic of the color filter stacked on the pixel of the image sensor unit 13, the cross-sectional view of the pixel, and the transmittance characteristic of the infrared neutral density filter, the arrays and the transmittance characteristics in the first to fourth embodiments may be appropriately combined and adopted.

Figure 21:
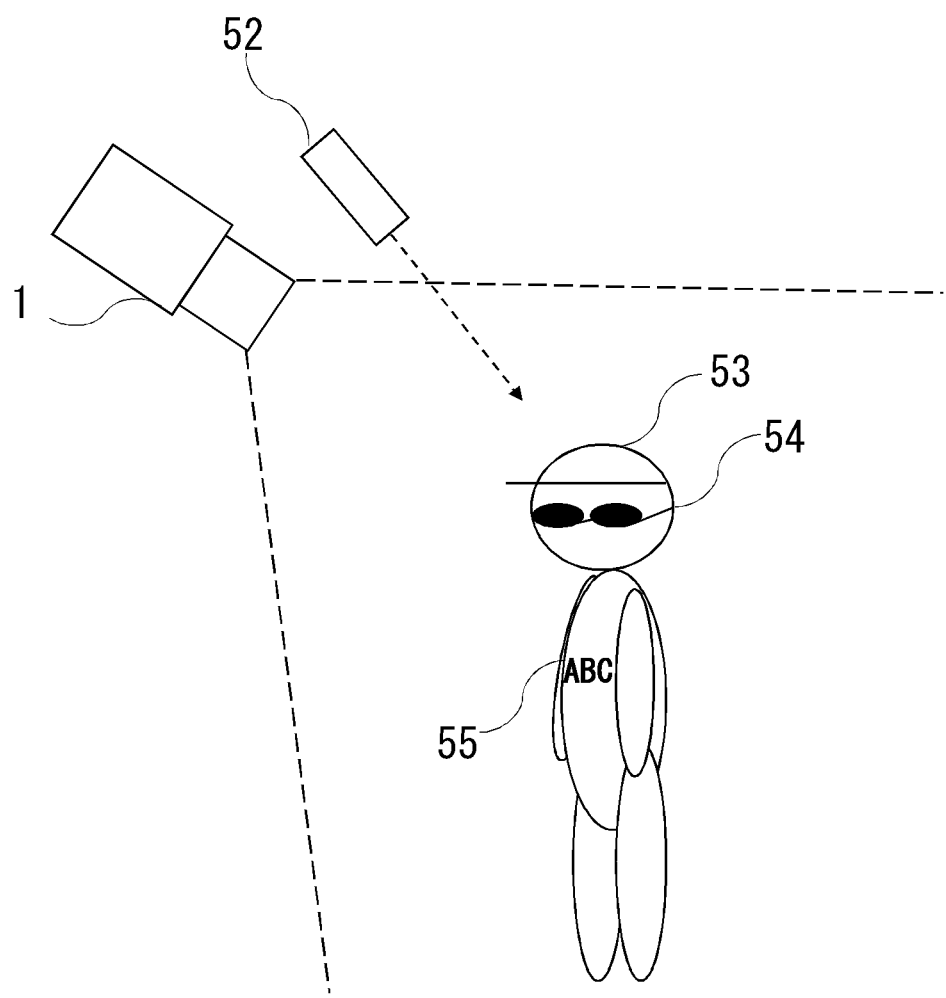
FIG. 21 is a view showing an example of application of the photoelectric conversion device according to an embodiment.

FIG. 21 shows an example of application of the photoelectric conversion device 1 according to the fifth embodiment. As shown in FIG. 21, an infrared irradiation device 52 applies infrared rays to an area in the angle of view which is imaged by the photoelectric conversion device 1. A subject 53 is a suspicious person imaged by the photoelectric conversion device 1 during, e.g., night-time monitoring. With regard to the material of sunglasses 54 worn by the subject 53, a common material which reflects visible light but allows the passage of infrared light is assumed to be used. In addition, with regard to clothes 55 worn by the subject 53, a complicated design ("ABC" in the drawing) which requires image generation with high resolution in the photoelectric conversion device 1 is assumed to be provided in the clothes 55.

Figure 22:
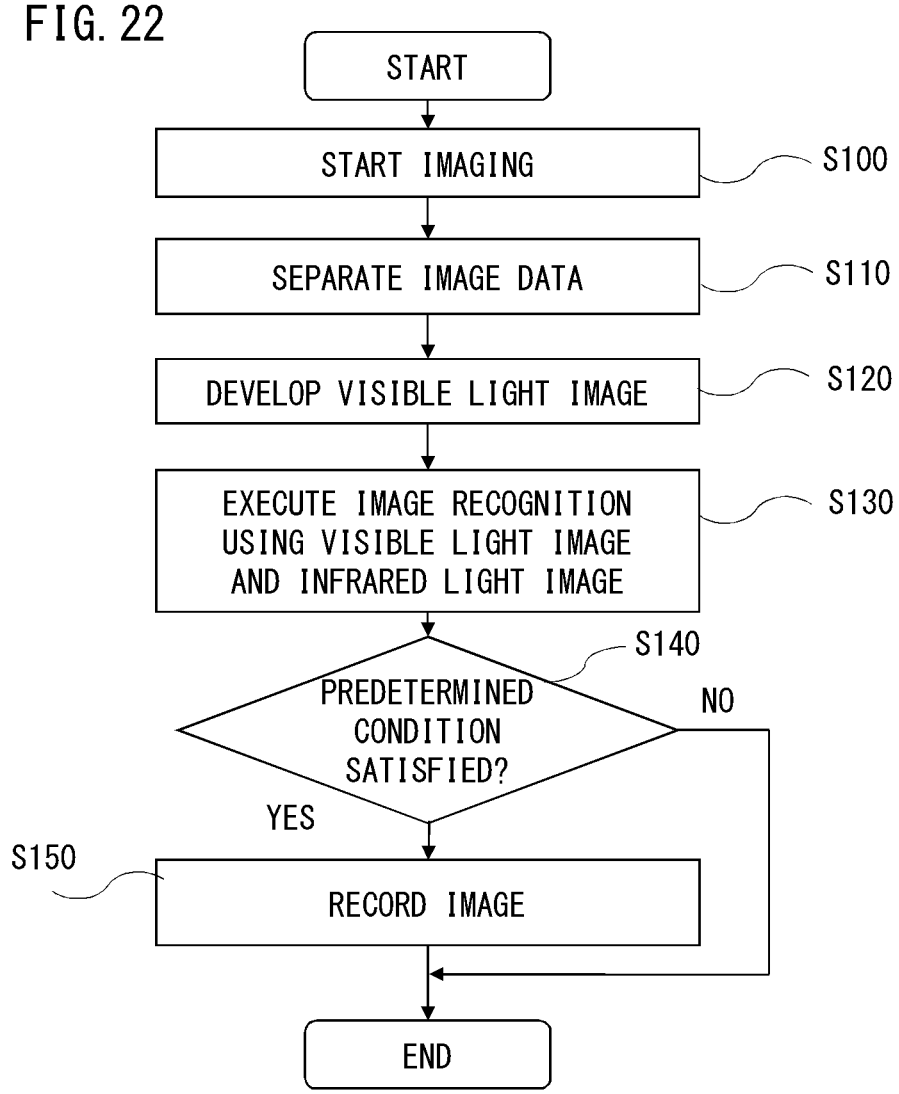
FIG. 22 is a flowchart showing an example of acquisition processing of aberration information in the embodiment.

(Processing Flow) FIG. 22 is a flowchart showing an example of a control method at the time of imaging of the subject 53 which is executed by the processor unit 14 of the photoelectric conversion device 1. First, in Step S100 (hereinafter simply described as "S100". The same applies to other steps), the image sensor unit 13 serving as the photoelectric conversion element receives an instruction to start imaging by an operation from, e.g., a user of the photoelectric conversion device 1, and starts imaging. Next, in S110, the image data separation unit 141 separates image data acquired by the imaging of the image sensor unit 13 into a visible light image and an infrared light image. Next, in S120, the processor unit 14 executes color development processing of the visible light image. Note that this processing may be executed by the external computer unit 15. Next, in S130, the processor unit 14 executes image recognition processing on the subject 53 by using the visible light image and the infrared light image. Note that this processing may be executed by the external computer unit 15.

Next, in S140, the processor unit 14 determines whether or not the subject 53 satisfies a predetermined condition related to the suspicious person with the image recognition processing in S130. Herein, examples of the predetermined condition include abnormal behavior of the subject 53 and abnormal clothes (a design of clothes) of the subject. For example, the predetermined condition includes that the subject 53 wears the sunglasses 54 as shown in FIG. 21 or that the subject 53 repeats back-and-forth movement in the angle of view. In the case where the subject 53 satisfies the predetermined condition (S140: YES), the processor unit 14 advances the processing to S150. On the other hand, in the case where the subject 53 does not satisfy the predetermined condition (S140: NO), the processor unit 14 ends the processing of the present flowchart. Note that the processor unit 14 may perform the determination processing by using a plurality of the predetermined conditions in S140, and may also be configured to advance to S150 in the case where at least one predetermined condition is satisfied. Alternatively, the processor unit 14 may also be configured to advance to S150 in the case where two or more or all predetermined conditions are satisfied. In S150, the processor unit 14 records the image of the subject 53 having served as a determination target in S140 in the image recording unit 17, and ends the processing of the present flowchart.

(Effect) According to the photoelectric conversion device according to the present embodiment, in the case where a suspicious person is found during, e.g., night-time photographing, it is possible to perform image generation having high sensitivity and high resolution, and hence it is possible to detect the subject determined to be the suspicious person with high accuracy and record the image thereof. For example, in the case where the subject 53 is determined to be the suspicious person in FIG. 21, it is possible to resolve the detail of the design of the clothes 55 in the visible light image of the subject 53, and reproduce the color of the clothes 55 with high accuracy. Further, in the infrared light image of the subject 53, it is possible to image eyes of the subject 53 through the sunglasses 54, and hence it becomes possible to discern expressions of the subject 53 from the infrared light image. With this, the image generated by the photoelectric conversion device 1 can be expected to be useful for preventing crime.

Sixth Embodiment (Configuration) Next, the photoelectric conversion device 1 according to a sixth embodiment will be described with reference to FIGS. 1, 23, and 24. An example of the configuration of the photoelectric conversion device 1 according to the sixth embodiment is the same as that of the photoelectric conversion device 1 according to the first embodiment shown in FIG. 1. In addition, in the photoelectric conversion device 1 according to the sixth embodiment, as the array and the transmittance characteristic of the color filter stacked on the pixel of the image sensor unit 13, the cross-sectional view of the pixel, and the transmittance characteristic of the infrared neutral density filter, the arrays and the transmittance characteristics in the first to fourth embodiments may be appropriately combined and adopted.

Figure 23:
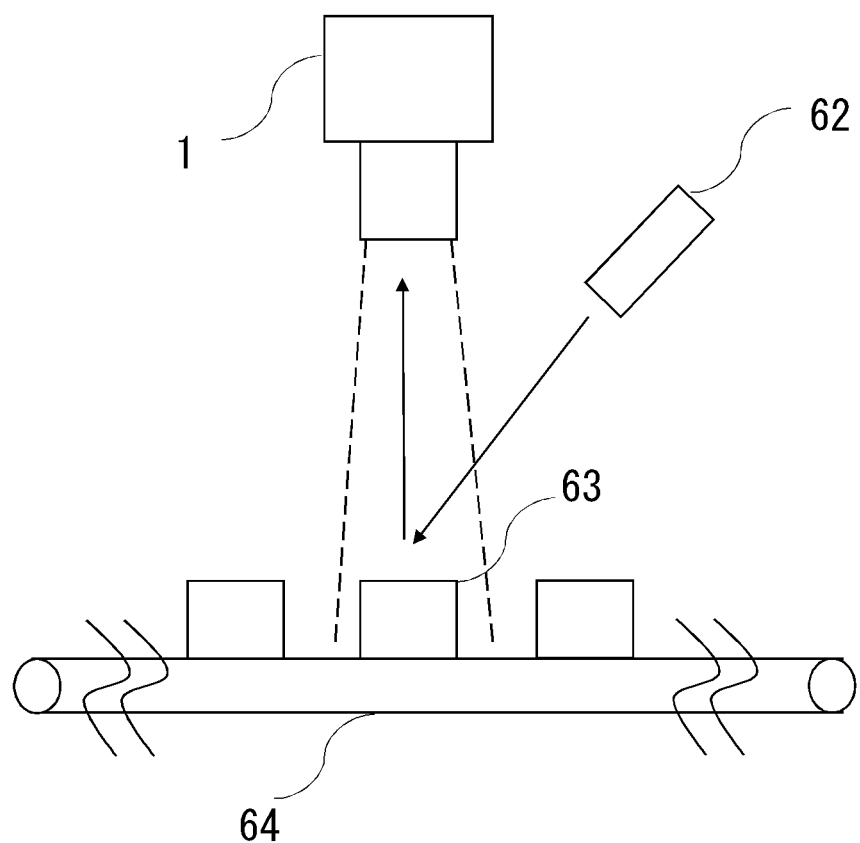
FIG. 23 is a view showing an example of application of the photoelectric conversion device according to an embodiment.

FIG. 23 shows an example of application of the photoelectric conversion device 1 according to the sixth embodiment. As shown in FIG. 23, an infrared irradiation device 62 applies infrared rays to an area in the angle of view which is imaged by the photoelectric conversion device 1 with low illuminance. An inspection object 63 is an object to be inspected which is imaged by the photoelectric conversion device 1 in this low-illuminance environment. A belt conveyer 64 conveys the inspection object 63 and moves the inspection object 63 in one direction.

Figure 24:
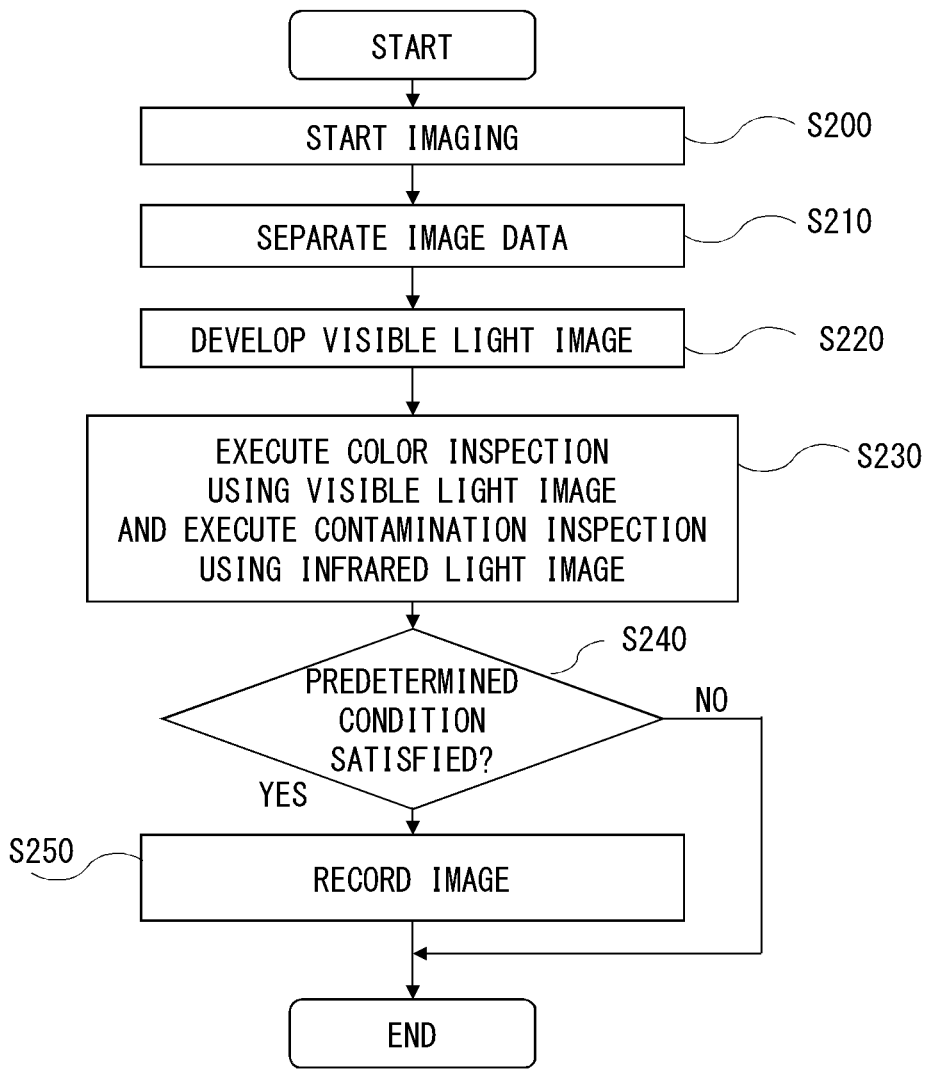
FIG. 24 is a flowchart showing an example of the acquisition processing of the aberration information in the embodiment.

(Flow) FIG. 24 is a flowchart showing an example of a control method at the time of imaging of the inspection object 63 which is executed by the processor unit 14 of the photoelectric conversion device 1. First, in S200, the image sensor unit 13 serving as the photoelectric conversion element receives an instruction to start imaging by an operation from, e.g., a user of the photoelectric conversion device 1, and starts imaging. Next, the image data separation unit 141 separates image data acquired by the imaging of the image sensor unit 13 into a visible light image and an infrared light image. Next, in S220, the processor unit 14 executes color development processing of the visible light image. Note that this processing may also be executed by the external computer unit 15. Next, in S230, the processor unit 14 executes color inspection of the inspection object 63 by using the visible light image with image recognition processing, and executes contamination inspection by using the infrared light image. Note that the color inspection and the contamination inspection can be implemented by using known techniques, and hence, herein, the detailed description thereof will be omitted.

Next, in S240, the processor unit 14 determines whether or not the inspection object 63 satisfies predetermined conditions related to appearance abnormality and contamination based on results of various inspections in S230. Herein, with regard to examples of the predetermined condition, examples of the predetermined condition in S240 include the occurrence of color unevenness in an image of the inspection object 63 in the visible light image, and the presence of a foreign matter which reflects infrared light from the inspection object 63 in the infrared light image. In the case where the inspection object 63 satisfies the predetermined condition (S240: YES), the processor unit 14 advances the processing to S250. On the other hand, in the case where the inspection object 63 does not satisfy the predetermined condition (S240: NO), the processor unit 14 ends the processing of the present flowchart. Note that the processor unit 14 may perform the determination processing by using a plurality of the predetermined conditions in S240, and may also be configured to advance to S250 in the case where at least one predetermined condition is satisfied. Alternatively, the processor unit 14 may also be configured to advance to S250 in the case where two or more or all predetermined conditions are satisfied. In S250, the processor unit 14 records the image of the inspection object 63 having served as the determination target in S240 in the image recording unit 17, and ends the processing of the present flowchart.

(Effect) According to the photoelectric conversion device according to the present embodiment, in the inspection of the inspection object in an environment in which an illumination condition is limited such as, e.g., a low-illuminance environment, it is possible to perform image generation having high sensitivity and high resolution, and hence it is possible to detect the inspection object having abnormality with high accuracy and record the image thereof. In addition, it is possible to execute inspection processing on both of the visible light image and the infrared light image, and hence it is possible to perform both of the appearance inspection and the contamination inspection of the inspection object. With this, for example, the appearance inspection and the contamination inspection can be expected to be performed on each of a plurality of inspection objects which are conveyed successively at high speed by the belt conveyer with high accuracy even when turnaround time (TAT) is reduced.

While the foregoing is the description related to the present embodiments, the configurations and the processing of the photoelectric conversion element and the photoelectric conversion device described above are not limited to the above-described embodiments, and various modifications may be made within the range which does not lose identity with the technical idea of the present invention. For example, the placement of the individual pixels of two columns×two rows described above is not limited to those shown in the drawings, and the pixels may be appropriately interchanged. In addition, the transmittance characteristic of each filter described above is not limited to those shown in the drawings, and the wavelength band of light which passes through the filter may be appropriately adjusted. Further, the same effects as those of the embodiments described above can be expected to be achieved also by arranging the pixels in the same manner as in each of the above embodiments in a pixel area in which at least one of the number of columns and the number of rows is larger than two.

Figure 25:
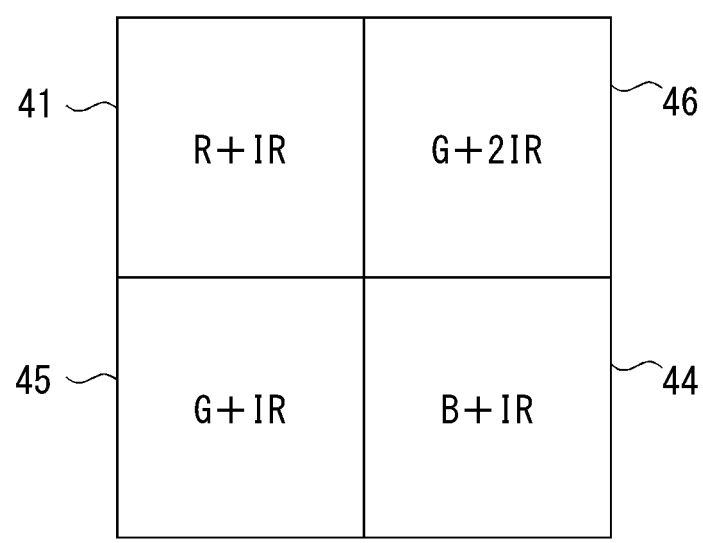
FIG. 25 is a view showing the color filter array of the image sensor unit according to a modification.
Figure 26:
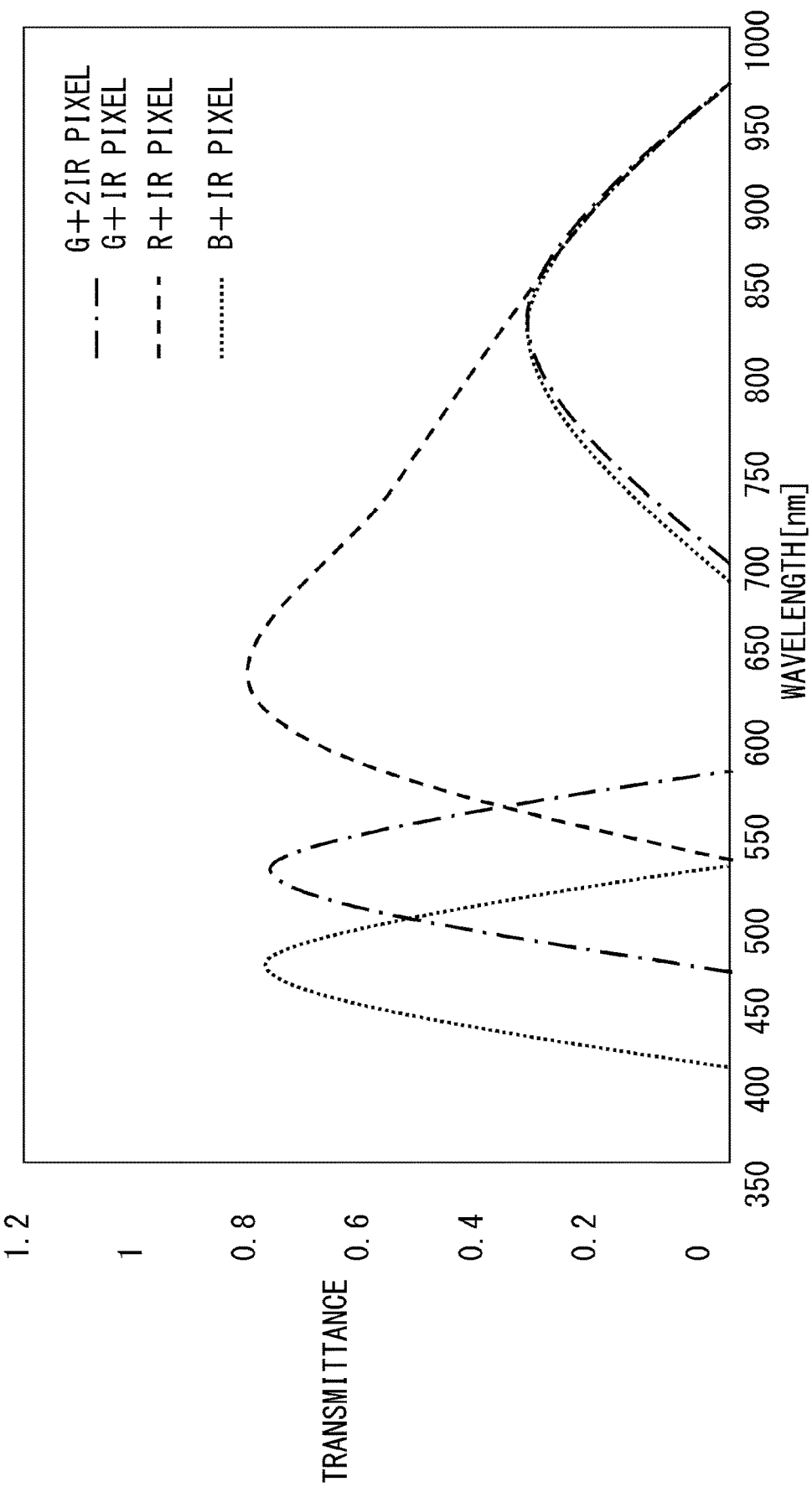
FIG. 26 is a view showing the transmittance characteristic of each wavelength of the color filter according to the modification.

In addition, in the embodiments described above, a pixel provided with a filter which allows the passage of light in a wavelength band of green (G) may also be adopted instead of the pixel provided with the filter which allows the passage of white light. For example, as shown in FIG. 25, as a modification of the first embodiment, it is possible to constitute one unit of the pixel area with the G+IR pixel 45 and G+2IR pixel 46 instead of the W+IR pixel 42 and the W+2IR pixel 43. In this case, the transmittance characteristic of each color filter corresponds to the transmittance characteristic shown in FIG. 26 instead of the transmittance characteristic shown in FIG. 5. Note that the transmittance characteristic shown in FIG. 26 is only an example, and the transmittance may be appropriately adjusted. In addition, by causing the configuration of the G+IR pixel 45 and the G+2IR pixel 46 to correspond to the configuration of the W+IR pixel 42 and the W+2IR pixel 43 described above, it is possible to achieve increases in the resolution and the sensitivity of each of the visible light image and the infrared light image.

According to the technique of the present disclosure, there are provided a photoelectric conversion element and a photoelectric conversion device which adequately perform separation between a visible component and an infrared component for the purpose of acquiring both of a visible light image and an infrared light image, and allow the visible light image to have high sensitivity and high resolution while maintaining high color separation.

(Other Embodiments) While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-188610, filed on Nov. 19, 2021, which is hereby incorporated by reference herein in its entirety.

What is claimed is:

1. A photoelectric conversion element comprising:
 a pixel area which includes a plurality of rows and a plurality of columns;
 a first filter which is provided in a first pixel constituting the pixel area and which allows passage of visible light in a first wavelength band and infrared light in a second wavelength band;
 a second filter which is provided in a second pixel constituting the pixel area and which allows the passage of the visible light in the first wavelength band and the infrared light in the second wavelength band; and
 a first light reduction unit which reduces the infrared light having passed through the second filter, wherein the first light reduction unit comprises a filter,
 wherein a third filter which allows the passage of the visible light in the first wavelength band and the infrared light in the second wavelength band is provided in, among pixels constituting the pixel area, each pixel other than the first pixel and the second pixel, and
 wherein a second light reduction unit which reduces the infrared light having passed through the third filter is provided in each pixel other than the first pixel and the second pixel constituting the pixel area, wherein the second light reduction unit comprises a filter.

2. The photoelectric conversion element according to claim 1, further comprising:
 an image data separation unit which separates image data of a subject into image data of a visible light component and image data of an infrared light component by performing addition and subtraction of a pixel value of each pixel constituting the pixel area,
 wherein the image data separation unit is implemented using a processor, or wherein the image data separation unit is implemented using a circuit.

3. The photoelectric conversion element according to claim 1, further comprising:
 a dual band pass filter (DBPF) which separates light into visible light and infrared light and causes the visible light and the infrared light to be incident on the pixel area.

4. The photoelectric conversion element according to claim 1, wherein the first light reduction unit is an infrared neutral density filter.

5. The photoelectric conversion element according to claim 1, wherein a light reduction rate of the infrared light of the second light reduction unit is lower than a light reduction rate of the infrared light of the first light reduction unit.

6. The photoelectric conversion element according to claim 1, wherein a light reduction rate of the infrared light of the second light reduction unit is equal to a light reduction rate of the infrared light of the first light reduction unit.

7. The photoelectric conversion element according to claim 1, wherein the visible light in the first wavelength band is white light.

8. The photoelectric conversion element according to claim 1, wherein the pixel area is a pixel area of two columns×two rows.

9. The photoelectric conversion element according to claim 8, wherein the pixel area includes the one first pixel and the three second pixels.

10. A photoelectric conversion device comprising:
the photoelectric conversion element according to claim 1; and
an image generation unit which generates a visible light image and an infrared light image by using a signal output from the photoelectric conversion element.

11. A photoelectric conversion element comprising:
a pixel area which includes a plurality of rows and a plurality of columns;
a fourth filter which is provided in a third pixel constituting the pixel area and which allows passage of visible light in a third wavelength band and infrared light in a fourth wavelength band;
a first photoelectric conversion photodiode unit which performs photoelectric conversion on the visible light and the infrared light having passed through the fourth filter;
a fifth filter which is provided in a fourth pixel constituting the pixel area and which allows the passage of the visible light in the third wavelength band and the infrared light in the fourth wavelength band; and
a second photoelectric conversion photodiode unit which performs photoelectric conversion on the visible light and the infrared light having passed through the fifth filter,
wherein a difference is provided between a depth of impurity implantation in the first photoelectric conversion photodiode unit and a depth of impurity implantation in the second photoelectric conversion photodiode unit.

12. The photoelectric conversion element according to claim 11, further comprising:
an image data separation unit which separates image data of a subject into image data of a visible light component and image data of an infrared light component by performing addition and subtraction of a pixel value of each pixel constituting the pixel area,
wherein the image data separation unit is implemented using a processor, or wherein the image data separation unit is implemented using a circuit.

13. The photoelectric conversion element according to claim 11, further comprising:
a dual band pass filter (DBPF) which separates light into visible light and infrared light and causes the visible light and the infrared light to be incident on the pixel area.

14. The photoelectric conversion element according to claim 11, wherein a sixth filter which allows the passage of the visible light in the third wavelength band and the infrared light in the fourth wavelength band is provided in each pixel other than the third pixel and the fourth pixel constituting the pixel area.

15. The photoelectric conversion element according to claim 14, wherein the fifth filter and the second photoelectric conversion photodiode unit are provided in each pixel other than the third pixel and the fourth pixel constituting the pixel area.

16. The photoelectric conversion element according to claim 11, wherein the visible light in the third wavelength band is white light.

17. The photoelectric conversion element according to claim 11, wherein the pixel area is a pixel area of two columns×two rows.

18. The photoelectric conversion element according to claim 17, wherein the pixel area includes the one third pixel and the three fourth pixels.

* * * * *